(12) United States Patent
Mitsui

(10) Patent No.: US 10,312,729 B2
(45) Date of Patent: Jun. 4, 2019

(54) ALTERNATING CURRENT UNINTERRUPTIBLE POWER SUPPLY SYSTEM

(71) Applicant: BROTHER KOGYO KABUSHIKI KAISHA, Nagoya-shi, Aichi (JP)

(72) Inventor: Yoshinori Mitsui, Kariya (JP)

(73) Assignee: BROTHER KOGYO KABUSHIKI KAISHA, Nagoya-Shi, Aichi (JP)

( * ) Notice: Subject to any disclaimer, the term of this patent is extended or adjusted under 35 U.S.C. 154(b) by 109 days.

(21) Appl. No.: 15/257,321

(22) Filed: Sep. 6, 2016

(65) Prior Publication Data

US 2016/0380477 A1 Dec. 29, 2016

Related U.S. Application Data

(63) Continuation of application No. PCT/JP2015/057274, filed on Mar. 12, 2015.

(30) Foreign Application Priority Data

Mar. 13, 2014 (JP) ................................ 2014-050021

(51) Int. Cl.
*H02J 9/06* (2006.01)
*H01M 16/00* (2006.01)
(Continued)

(52) U.S. Cl.
CPC .......... *H02J 9/062* (2013.01); *H01M 8/0432* (2013.01); *H01M 8/04328* (2013.01);
(Continued)

(58) Field of Classification Search
CPC .. Y02T 90/34; B60L 11/1887; H01M 16/006; H01M 8/04626; H01M 8/04753
See application file for complete search history.

(56) References Cited

U.S. PATENT DOCUMENTS

| | | |
|---|---|---|
| 2004/0053082 A1 | 3/2004 | McCluskey et al. |
| 2005/0122653 A1 | 6/2005 | McCluskey et al. |
| 2011/0304295 A1* | 12/2011 | McNally ............... H01M 10/46 320/101 |

FOREIGN PATENT DOCUMENTS

| | | |
|---|---|---|
| JP | 2000-333386 A | 11/2000 |
| JP | 2002-329517 A | 11/2002 |

(Continued)

OTHER PUBLICATIONS

English translation of International Search Report issued in PCT/JP2015/057274 dated Jun. 2, 2015.
(Continued)

*Primary Examiner* — Hal Kaplan
*Assistant Examiner* — Elim Ortiz
(74) *Attorney, Agent, or Firm* — K&L Gates LLP

(57) ABSTRACT

An alternating current uninterruptible power supply system includes a first power feed line, a second power feed line, a switchover relay, a converter, a power switch, a fuel cell, a system control board, a battery, and an inverter. If it is determined that electric power supply from a commercial alternating current power source has stopped for a first time or longer, a system control part of the system control board switches the switchover relay from a first state to a second state. Then, on the basis of the state of the electric power of the first power feed line, the system control part determines whether or not stopping of the electric power supply from the commercial alternating current power source has continued for a second time or longer. After that, if it is determined that the stopping of the electric power supply from the commercial alternating current power source has continued for the second time or longer, the system control part starts power generation of the stack.

17 Claims, 7 Drawing Sheets

(51) Int. Cl.
　　　*H01M 8/0432*　　(2016.01)
　　　*H01M 8/04701*　(2016.01)
　　　*H01M 8/04955*　(2016.01)
　　　*H01M 8/04537*　(2016.01)
　　　*H02J 1/00*　　　(2006.01)

(52) U.S. Cl.
　　　CPC ... *H01M 8/04604* (2013.01); *H01M 8/04708* (2013.01); *H01M 8/04955* (2013.01); *H01M 16/006* (2013.01); *H02J 1/00* (2013.01); *H02J 2001/004* (2013.01); *Y02B 90/14* (2013.01)

(56) References Cited

FOREIGN PATENT DOCUMENTS

| JP | 2004-229416 A | 8/2004 |
| JP | 2005-539471 A | 12/2005 |
| JP | 2007-228685 A | 9/2007 |
| JP | 2010-192146 A | 9/2010 |
| JP | 2010-282727 A | 12/2010 |

OTHER PUBLICATIONS

Written Opinion of the International Searching Authority issued in PCT/JP2015/057274 dated Jun. 2, 2015.

\* cited by examiner

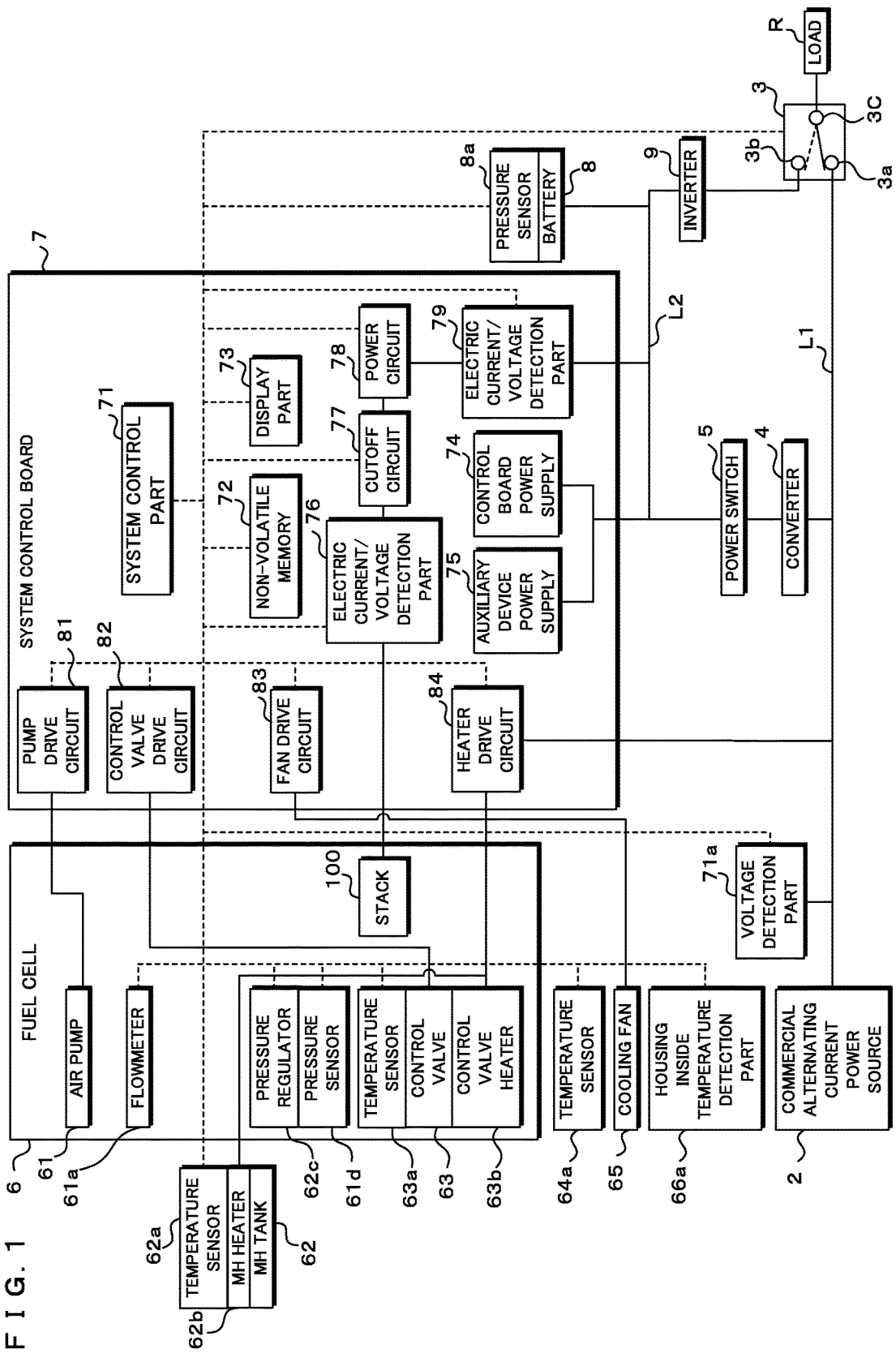
F I G. 1

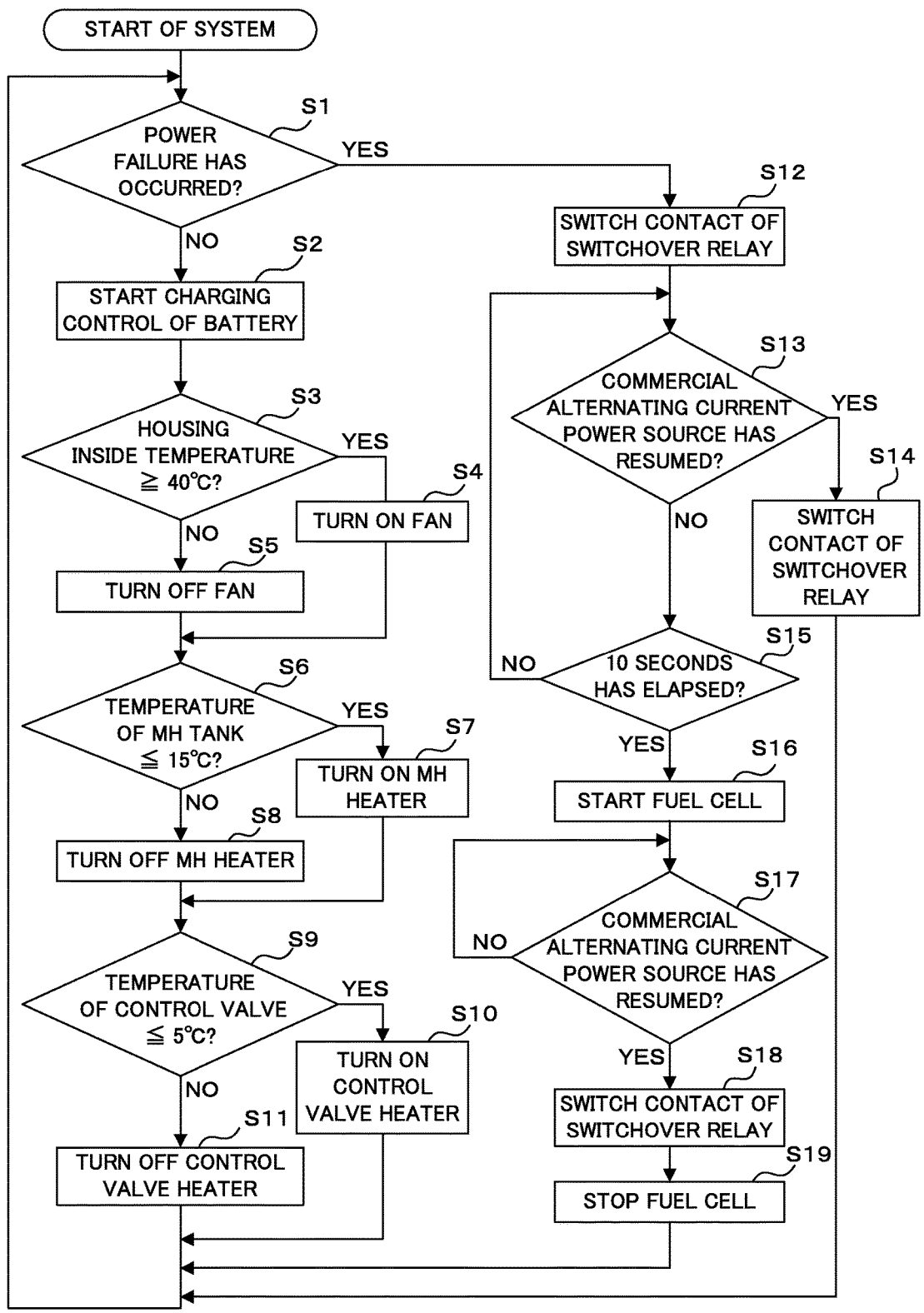

DETECTION OF POWER FAILURE

POWER RESUMPTION DETECTION

ALTERNATING CURRENT UNINTERRUPTIBLE POWER SUPPLY SYSTEM

CROSS-REFERENCE TO RELATED APPLICATIONS

The present application is a continuation application of International Application No. PCT/JP2015/057274 which has an International date of Mar. 12, 2015 and designated the United States of America, and claiming priority on Japanese Patent Application No. 2014-050021 filed on Mar. 13, 2014. The contents of these applications are incorporated herein by reference in their entirety.

FIELD

The present disclosure relates to an alternating current uninterruptible power supply system supplying electric power from a fuel cell at the time of power failure of a commercial alternating current power source.

BACKGROUND

Uninterruptible power supply systems are generally known. For example, an uninterruptible power supply system is applied to an equipment connected to a commercial alternating current power source. Then, when electric power supply from the commercial alternating current power source to the equipment becomes down by power failure, the uninterruptible power supply system continues the electric power supply to the equipment for a fixed time.

Some uninterruptible power supply systems employs fuel cells. For example, Japanese Patent Application Laid-Open Publication No. 2004-229416 describes a direct current power supply system having a configuration that a rectifier, a storage battery, and a fuel cell device are connected between a commercial power source and a load. In this direct current power supply system, at the time of power failure of the commercial power source, the direct current power of the storage battery is supplied to the load. A control part provided in the fuel cell device detects the output voltage of the storage battery. If the output voltage of the storage battery goes to or below a reference value, the control part starts the fuel cell. In general, the storage battery has a characteristic that the output voltage decreases with decreasing remaining battery charge. The uninterruptible power supply system of the conventional art utilizes this characteristic of the storage battery so that, if the output voltage of the storage battery goes to or below a reference value, the remaining battery charge of the storage battery is recognized as having decreased so that the fuel cell is started.

SUMMARY

The uninterruptible power supply system of the conventional art described above has a configuration that the fuel cell is started depending on the output voltage of the storage battery. Thus, the uninterruptible power supply system of the conventional art has a problem that both start control and stop control of the fuel cell are unstable. That is, factors that could cause fluctuation in the output voltage of the storage battery are not limited to a decrease in the remaining battery charge alone. For example, the magnitude of the internal resistance of the storage battery causes a situation that the output voltage of the storage battery fluctuates also depending on the current value extracted from the storage battery. Thus, when the current value consumed by the load connected to the uninterruptible power supply system of the conventional art fluctuates, the output voltage of the storage battery also fluctuates. Accordingly, when the output voltage approaches a reference value in association with a decrease in the remaining battery charge of the storage battery, a situation is expected that the output voltage of the storage battery fluctuates near the reference value in accordance with fluctuation in the current value consumed by the load. Then, when the output voltage of the storage battery fluctuates near the reference value as described above, starting and stopping of the fuel cell are repeated. In particular, when a storage battery having a small capacity is employed in association with size reduction in the fuel cell for emergency, the internal resistance of the storage battery increases and hence the fluctuation in the output voltage becomes more remarkable. Thus, in the uninterruptible power supply system of the conventional art, start control and stop control of the fuel cell become more unstable with decreasing capacity of the storage battery.

The present disclosure has been devised in view of the above-described problem. An object thereof is to provide an alternating current uninterruptible power supply system in which both start control and stop control of a fuel cell for emergency are allowed to be stably performed.

To achieve the object, an alternating current uninterruptible power supply system according to an aspect of the present disclosure, supplying electric power from a fuel cell at the time of power failure of a commercial alternating current power source, comprises: a switch provided with a first input part, a second input part, and an output part and allowed to perform, in response to an inputted instruction, switching to a first state that the first input part and the output part are connected to each other or to a second state that the second input part and the output part are connected to each other; a first power feed line electrically connected to the first input part of the switch and transmitting electric power from the commercial alternating current power source; a second power feed line electrically connected to the second input part of the switch and transmitting electric power from the fuel cell; the fuel cell electrically connected to the second power feed line and provided with a stack constructed from a plurality of unit battery cells generating electric power by means of a reaction between fuel gas and oxidation gas and with a plurality of control valves allowed to adjust supply of the fuel gas and the oxidation gas to the stack in response to an inputted instruction; a battery allowed to be charged and connected to the second power feed line in parallel to the stack; a converter connected between the first power feed line and the second power feed line; an inverter connected to the second power feed line between the battery and the second input part; an electric power detection part outputting a result corresponding to a state of the electric power from the commercial alternating current power source flowing through the first power feed line; and a control part, wherein the control part performs at least the following controls a) to d):

a) a control of, on the basis of the result outputted from the electric power detection part, determining whether or not the electric power supply from the commercial alternating current power source has stopped for a first time or longer;

b) a control of, if it is determined that the electric power supply from the commercial alternating current power source has stopped for the first time or longer, transmitting an instruction of switching a contact from the first state to the second state to the switch;

c) a control of, after the control b) described above, on the basis of the result outputted from the electric power detection part, determining whether or not the stopping of the electric power supply from the commercial alternating current power source has continued for a second time or longer which is longer than the first time; and d) a control of, if it is determined that the stopping of the electric power supply from the commercial alternating current power source has continued for the second time or longer, transmitting an instruction of starting power generation of the fuel cell to the fuel cell.

To achieve the object, an alternating current uninterruptible power supply system according to another aspect of the present disclosure, supplying electric power from a fuel cell at the time of power failure of a commercial alternating current power source, comprises: a switch provided with a first input part, a second input part, and an output part and allowed to perform, in response to an inputted instruction, switching to a first state that the first input part and the output part are connected to each other or to a second state that the second input part and the output part are connected to each other, the first input part being allowed to receive alternating current electric power from the commercial alternating current power source; the fuel cell electrically connected to the second input part of the switch and provided with a stack constructed from a plurality of unit battery cells generating electric power by means of a reaction between fuel gas and oxidation gas and with a plurality of valves allowed to adjust supply of the fuel gas and the oxidation gas to the stack in response to an inputted instruction; a battery allowed to be charged and electrically connected to the second input part of the switch in parallel to the fuel cell; an electric power detection part outputting a result corresponding to a state of the electric power of the commercial alternating current power source received by the first input part; and a control part, wherein the control part performs at least the following controls a) to d):

a) a control of, on the basis of the result outputted from the electric power detection part, determining whether or not the electric power supply from the commercial alternating current power source has stopped for a first time or longer;

b) a control of, if it is determined that the electric power supply from the commercial alternating current power source has stopped for the first time or longer, transmitting an instruction of switching a contact from the first state to the second state to the switch;

c) a control of, after the control b) described above, on the basis of the result outputted from the electric power detection part, determining whether or not the stopping of the electric power supply from the commercial alternating current power source has continued for a second time or longer; and d) a control of, if it is determined that the stopping of the electric power supply from the commercial alternating current power source has continued for the second time or longer, transmitting an instruction of starting power generation of the fuel cell to the fuel cell.

According to the alternating current uninterruptible power supply system of the present disclosure, both start control and stop control of a fuel cell for emergency are allowed to be stably performed.

The above and further objects and features will more fully be apparent from the following detailed description with accompanying drawings.

BRIEF DESCRIPTION OF THE DRAWINGS

FIG. 1 is a block diagram illustrating outlines of an alternating current uninterruptible power supply system;

FIG. 7 is a flow chart illustrating control processing of an alternating current uninterruptible power supply system;

DETAILED DESCRIPTION

Figure 2:
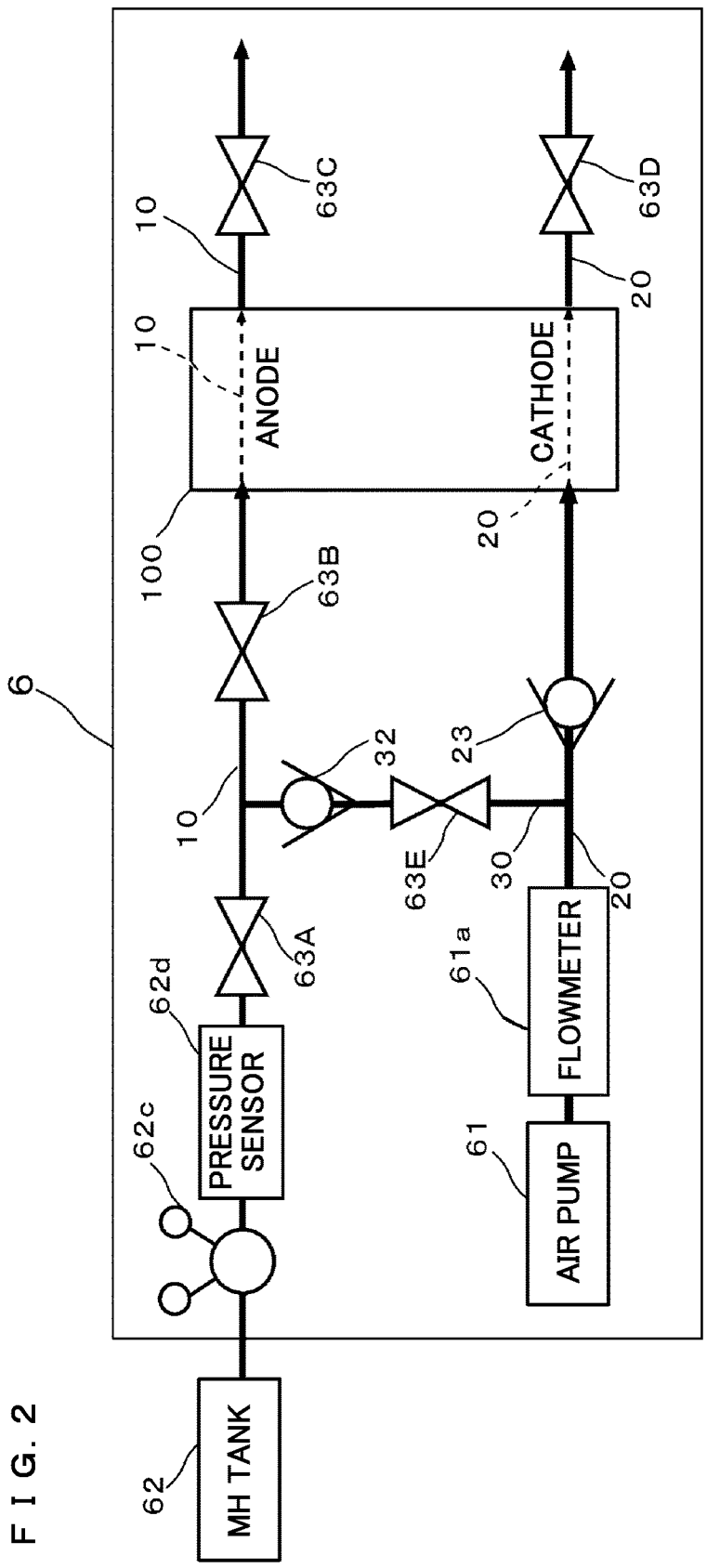
FIG. 2 is a block diagram illustrating outlines of a configuration relevant to pipes of a fuel cell provided in an alternating current uninterruptible power supply system.

An alternating current uninterruptible power supply system according to an embodiment of the present disclosure is described below with reference to the drawings. Here, in the following description, distinction is required between connection of individual components of the alternating current uninterruptible power supply system 1 illustrated in FIG. 1 performed by using electrically conductive materials and connection of individual components of a fuel cell illustrated in FIG. 2 performed by using pipes. Thus, in the following description, connection through an electrically conductive material is referred to as "electrical connection". This "electrical connection" includes both of a case that two components are directly connected to each other and a case that two components are indirectly connected. For example, the "electrical connection" includes a case that a battery 8 illustrated in FIG. 1 is directly connected to a second power feed line L2. Further, for example, the "electrical connection" also includes a case that a fuel cell 6 illustrated in FIG. 1 is indirectly connected to the second power feed line L2 via a system control board 7. Even in this case, the fuel cell 6 is electrically connected to the second power feed line L2.

<Overall Configuration of System>

In FIG. 1, the alternating current uninterruptible power supply system 1 of the present embodiment includes a first power feed line L1, a second power feed line L2, a switchover relay 3, a converter 4, a power switch 5, a fuel cell 6, a system control board 7, a battery 8, and an inverter 9. The switchover relay 3 is an example of the switch for switching between the first power feed line L1 and the second power feed line L2.

The alternating current uninterruptible power supply system 1 having the above-described configuration supplies the electric power of a commercial alternating current power source 2 to a load R in a normal situation that power failure is not occurring in the commercial alternating current power source 2. On the other hand, at the time of power failure of the commercial alternating current power source 2, the alternating current uninterruptible power supply system 1 supplies the electric power of the fuel cell 6 or the battery 8 to the load R. The expression "in a normal situation" in the following description indicates a situation that electric power is being supplied from the commercial alternating current power source 2. Further, the expression "at the time of power failure" in the following description indicates a situation that electric power is not being supplied from the commercial alternating current power source 2. The load R is an arbitrary electronic equipment that operates on the basis of the electric power supply from the commercial alternating current power source 2 in a normal situation.

The electric power supplied from the commercial alternating current power source 2 flows through the first power feed line L1. The first power feed line L1 is electrically connected to a first input part 3a of the switchover relay 3. On the other hand, the electric power supplied from the fuel cell 6 or the battery 8 flows through the second power feed line L2. The second power feed line L2 is electrically connected through the inverter 9 to a second input part 3b of the switchover relay 3. The load R is electrically connected to an output part 3c of the switchover relay 3.

The fuel cell 6, the system control board 7, and the battery 8 are electrically connected to the second power feed line L2 in parallel to each other. The inverter 9 is electrically connected to a position between the fuel cell 6, the system control board 7, plus the battery 8 in the second power feed line L2 and the second input part 3b of the switchover relay 3. The switchover relay 3 described above is electrically connected through the inverter 9 to the second power feed line L2.

The second power feed line L2 is electrically connected through the converter 4 and the power switch 5 to the first power feed line L1. The alternating current uninterruptible power supply system 1 is started when the power switch 5 is turned ON. In a normal situation, auxiliary devices of the fuel cell 6, the system control board 7, and the battery 8 receive electric power supply from the commercial alternating current power source 2. The electric power from the commercial alternating current power source 2 is converted from an alternating current into a direct current by the converter 4 and, after that, supplied to the auxiliary devices of the fuel cell 6, the system control board 7, and the battery 8. An MH heater 62b and a control valve heater 63b are electrically connected to the first power feed line L1 without intervention of the converter 4 and the power switch 5. In a normal situation, the MH heater 62b and the control valve heater 63b receive electric power supply from the commercial alternating current power source 2.

On the other hand, at the time of power failure, the auxiliary devices of the fuel cell 6, the system control board 7, and the battery 8 receive electric power supply from a stack 100 of the fuel cell 6. During the time after power failure occurred in the commercial alternating current power source 2 until the fuel cell 6 is started, the battery 8 supplies electric power to the auxiliary devices of the fuel cell 6, the system control board 7, and the load R.

<Fuel Cell>

As illustrated in FIG. 1, the fuel cell 6 includes an air pump 61, a flowmeter 61a, a pressure regulator 62c, a plurality of control valves 63, and a stack 100. Each solid line in FIG. 1 indicates a supply route of electric power. Each dashed line in FIG. 1 indicates a transmission route for a signal such as a detection result and an instruction. On the other hand, each pipe connecting individual components of the fuel cell 6 described above is indicated by a thick solid line in FIG. 2. First, a configuration relevant to the pipes of the fuel cell 6 is described below with reference to FIG. 2. Then, the individual components of the fuel cell 6 illustrated in FIG. 1 are described with reference to FIGS. 3, 4, 5A, and 5B.

In FIG. 2, a hydrogen passage member 10 constructed from a pipe through which hydrogen flows is connected to the anode-side inlet and outlet of the stack 100. On the other hand, an air passage member 20 constructed from a pipe through which air flows is connected to the cathode-side inlet and outlet of the stack 100. One end and the other end of a substitution passage member 30 are connected respectively to a middle position of the hydrogen passage member 10 connected to the anode-side inlet of the stack 100 and to a middle position of the air passage member 20 connected to the cathode-side inlet of the stack 100.

In the present embodiment, hydrogen is an example of fuel gas and air is an example of oxidation gas. The gases employed for power generation in the fuel cell 6 are not limited to hydrogen and air. Further, for example, as the hydrogen passage member 10, the air passage member 20, and the substitution passage member 30, a hard or soft pipe or tube may be employed. For example, the construction material of the hard pipe or tube may be a metal such as stainless steel. For example, the construction material of the soft pipe or tube may be an engineering plastic of diverse kind or a synthetic resin like polypropylene.

An MH tank 62 serving as a supply source of hydrogen is arranged in an end part of the hydrogen passage member 10 connected to the anode-side inlet of the stack 100. With adopting as a reference the flow of hydrogen, the position where the MH tank 62 is arranged is defined as the most upstream side of the hydrogen passage member 10. Between the MH tank 62 and the stack 100 in the hydrogen passage member 10, a pressure regulator 62c, a pressure sensor 62d, a first control valve 63A, and a second control valve 63B are arranged in this order from upstream to downstream. A third control valve 63C is arranged in the hydrogen passage member 10 connected to the anode-side outlet of the stack 100. The first control valve 63A and the second control valve 63B are both hydrogen cutoff valves. The third control valve 63C is a hydrogen purge valve. The MH tank 62, the pressure regulator 62c, and the pressure sensor 62d are described later with reference to FIG. 1.

The first control valve 63A and the second control valve 63B both go into an opened state at the time of start of the fuel cell 6 so that the hydrogen to be supplied from the MH tank 62 to the stack 100 flows into the hydrogen passage member 10. The first control valve 63A and the second control valve 63B both go into a closed state at the time of stopping of the fuel cell 6 so as to shut off the hydrogen supplied from the MH tank 62. In a case that abnormality occurs in the closing operation of the third control valve 63C, the first control valve 63A and the second control valve 63B both go into a closed state so as to shut off the supply of hydrogen to the stack 100. The first control valve 63A and the second control valve 63B doubly prevent the leakage of hydrogen caused by the abnormality in the closing operation of the third control valve 63C serving as a hydrogen purge valve.

Here, water generated by the stack 100 and impurities whose concentration has increased in association with power generation are collected in the inside of the hydrogen passage member 10 connected to the outlet side of the stack 100. In an opened state, the third control valve 63C discharges to the outside the water and the impurities collected in the hydrogen passage member 10. When the first control valve 63A and the second control valve 63B are open and the third control valve 63C is closed, hydrogen at a pressure adjusted by the pressure regulator 62c is enclosed in the inside of the hydrogen passage member 10. That is, the fuel cell 6 is of a dead end type.

For example, the first control valve 63A, the second control valve 63B, and the third control valve 63C are each constructed from a solenoid valve allowed to change between an opened state and a closed state in response to an instruction (e.g., a signal) from the system control part 71 illustrated in FIG. 1. However, each valve employed in the implementation of the present disclosure is not limited to a solenoid valve. In the implementation of the present disclosure, in place of the solenoid valve, for example, an electrically operated valve whose opening state is allowed to be adjusted by a motor may be employed.

On the other hand, the air pump 61 serving as a supply source of air is arranged in an end part of the air passage member 20 connected to the cathode-side inlet of the stack 100. With adopting as a reference the air flow, the position where the air pump 61 is arranged is defined as the most upstream side of the air passage member 20. Between the air pump 61 and the stack 100 in the air passage member 20, a flowmeter 61a and a check valve 23 are arranged in this order from upstream to downstream. A fourth control valve 63D is arranged in the air passage member 20 connected to the cathode-side outlet of the stack 100. The air pump 61 and the flowmeter 61a are described later with reference to FIG. 1.

The check valve 23 permits a flow from one side to the other side of the air passage member 20 and restricts a flow from the other side to the one side. In the present embodiment, the check valve 23 permits an air flow from the upstream to the downstream of the air passage member 20, that is, from the air pump 61 side to the stack 100 side. The check valve 23 shuts off the air flow from the downstream to the upstream of the air passage member 20, that is, from the stack 100 side to the air pump 61 side. The check valve 23 is an example of the cutoff valve. As the check valve 23, for example, a check valve of arbitrary type such as poppet type, swing type, wafer type, lift type, ball type, and foot type may be employed. Here, a solenoid valve may be employed in place of the check valve 23.

In an opened state, the fourth control valve 63D discharges to the outside the water generated on the cathode side of the stack 100. The fourth control valve 63D goes into a closed state at the time of stopping of the stack 100. When the fourth control valve 63D has gone into a closed state, the discharge of air from the stack 100 to the outside is shut off so that the humidity in first passages 111a of a separator 110 described later is maintained. By virtue of this, dryness of a cathode electrode 132 of a solid polymer electrolyte membrane (referred to as an electrolyte membrane, hereinafter) 131 is prevented. For example, the fourth control valve 63D is constructed from a solenoid valve allowed to change between an opened state and a closed state in response to an instruction (e.g., a signal) from the system control part 71 illustrated in FIG. 1. However, the valve employed in the implementation of the present disclosure is not limited to a solenoid valve. In the implementation of the present disclosure, in place of the solenoid valve, for example, an electrically operated valve whose opening state is allowed to be adjusted by a motor may be employed.

The substitution passage member 30 is used for causing air to flow from the air passage member 20 to the hydrogen passage member 10. The substitution passage member 30 is connected to a position between the first control valve 63A and the second control valve 63B in the hydrogen passage member 10 and to a position between the flowmeter 61a and the check valve 23 in the air passage member 20. A fifth control valve 63E is arranged on the air passage member 20 side of the substitution passage member 30. A check valve 32 serving as an example of the cutoff valve is arranged on the hydrogen passage member 10 side of the substitution passage member 30.

The fifth control valve 63E is used for establishing fluid communication or shutoff between the hydrogen passage member 10 and the air passage member 20. For example, a substitution valve 31 is constructed from a solenoid valve allowed to change between an opened state and a closed state in response to an instruction (e.g., a signal) from the system control part 71 illustrated in FIG. 1. However, the valve employed in the implementation of the present disclosure is not limited to a solenoid valve. In the implementation of the present disclosure, in place of the solenoid valve, for example, an electrically operated valve whose opening state is allowed to be adjusted by a motor may be employed.

At the time of operation of the fuel cell 6, the fifth control valve 63E goes into a closed state in accordance with an instruction from the system control part 71 so as to shut off a flow between the hydrogen passage member 10 and the air passage member 20. By virtue of this, the air supplied from the air pump 61 flows through the air passage member 20 to the cathode side of the stack 100. On the other hand, at the time of stopping of the fuel cell 6, the fifth control valve 63E goes into an opened state in accordance with an instruction from the system control part 71 so as to establish fluid communication between the hydrogen passage member 10 and the air passage member 20. By virtue of this, a route is formed along the air passage member 20, the substitution passage member 30, and the hydrogen passage member 10. At that time, the air supplied from the air pump 61 flows from the air passage member 20 through the substitution passage member 30 to the hydrogen passage member 10. After that, the air flows from the hydrogen passage member 10 to the anode side of the stack 100 and thereby discharges to the outside the hydrogen gas remaining in second passages 117a of the separator 110 described later.

The check valve 32 permits a flow from one side to the other side of the substitution passage member 30 and restricts a flow from the other side to the one side. That is, the check valve 32 permits an air flow from the air passage member 20 side to the hydrogen passage member 10 side. The check valve 32 shuts off a hydrogen flow from the hydrogen passage member 10 side to the air passage member 20 side. As the check valve 32, for example, a check valve of arbitrary type such as poppet type, swing type, wafer type, lift type, ball type, and foot type may be employed. Here, a solenoid valve may be employed in place of the check valve 32.

<<Stack>>

Figure 3:
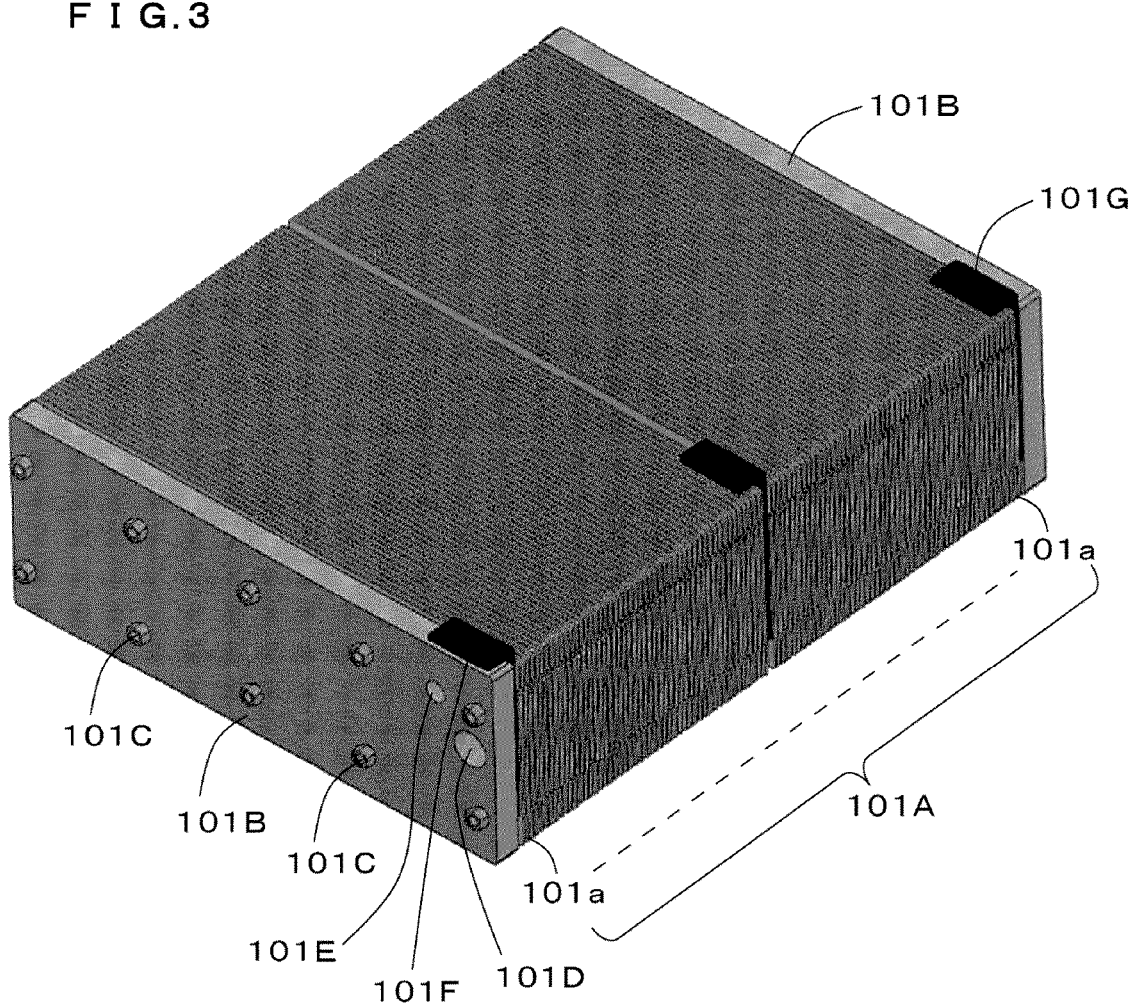
FIG. 3 is a perspective view illustrating a stack of a fuel cell provided in an alternating current uninterruptible power supply system.

As illustrated in FIG. 3, the stack 100 includes a plurality of unit battery cells 101a and two end plates 101B. The plurality of unit battery cells 101a constitute a unit battery cell group 101A stacked in series to each other. One of the two end plates 101B is arranged at one end of the unit battery cell group 101A. The other one of the two end plates 101B is arranged at the other end of the unit battery cell group 101A. A plurality of bolts 101C go through the plurality of unit battery cells 101a and the two end plates 101B so as to fix together the plurality of unit battery cells 101a and the two end plates 101B.

An air inlet hole 101D and a hydrogen inlet hole 101E are formed in one end plate 101B. The air inlet hole 101D is in fluid communication with first through holes 112 of the separator 110 described later. The air pump 61 is connected through the air passage member 20 located in the upstream of the stack 100 described above, to the air inlet hole 101D.

The hydrogen inlet hole 101E is in fluid communication with third through holes 114 of the separator 110 described later. The MH tank 62 is connected through the hydrogen passage member 10 located in the upstream of the stack 100 described above, to the hydrogen inlet hole 101E.

An air discharge hole (not illustrated) and a hydrogen discharge hole (not illustrated) are formed in the other end plate 101B. The air discharge hole is in fluid communication with second through holes 113 of the separator 110 described later. The air passage member 20 located in the downstream of the stack 100 described above is connected to the air discharge hole. The hydrogen discharge hole is in fluid communication with fourth through holes 115 of the separator 110 described later. The hydrogen passage member 10 located in the downstream of the stack 100 described above is connected to the hydrogen discharge hole.

A collecting electrode plate 101F is provided between one end plate 101B and the unit battery cell group 101A. A collecting electrode plate 101G is provided between the other end plate 101B and the unit battery cell group 101A. These collecting electrode plates 101F and 101G are connected through the system control board 7 described later, to the second power feed line L2. At the time of power failure, the electric power generated by the stack 100 is supplied through the second power feed line L2 to the auxiliary devices of the fuel cell 6, the system control board 7, the battery 8, and the load R.

Figure 4:
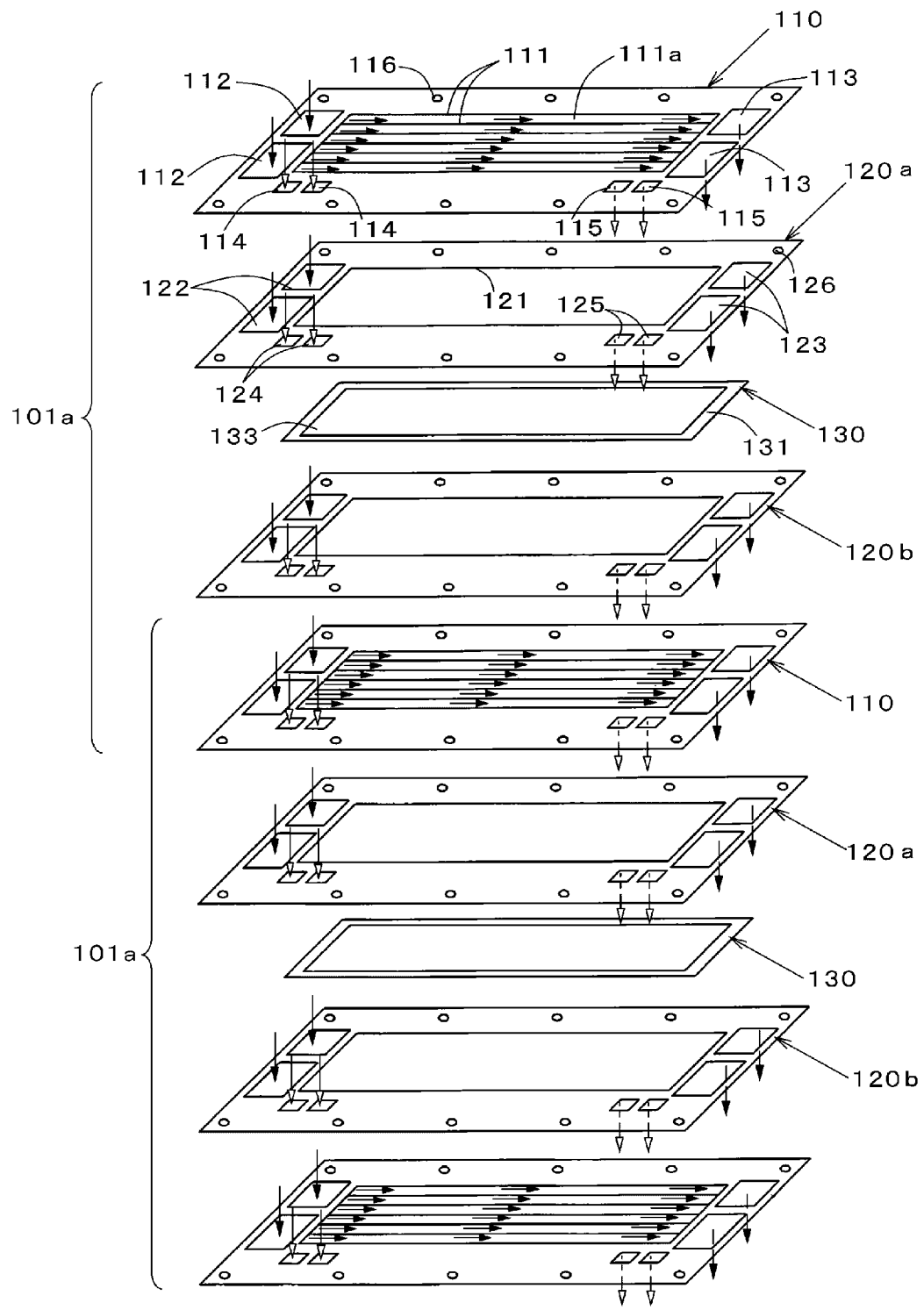
FIG. 4 is an exploded perspective view illustrating a configuration of a stack described above.
Figure 5A:
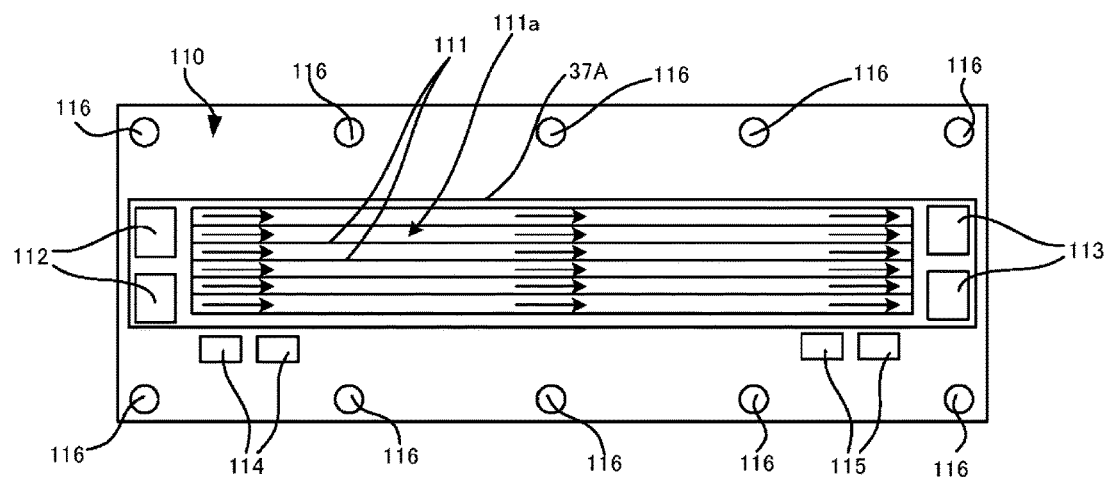
FIG. 5A is a plan view illustrating a front face of a separator constituting a unit battery cell.
Figure 5B:
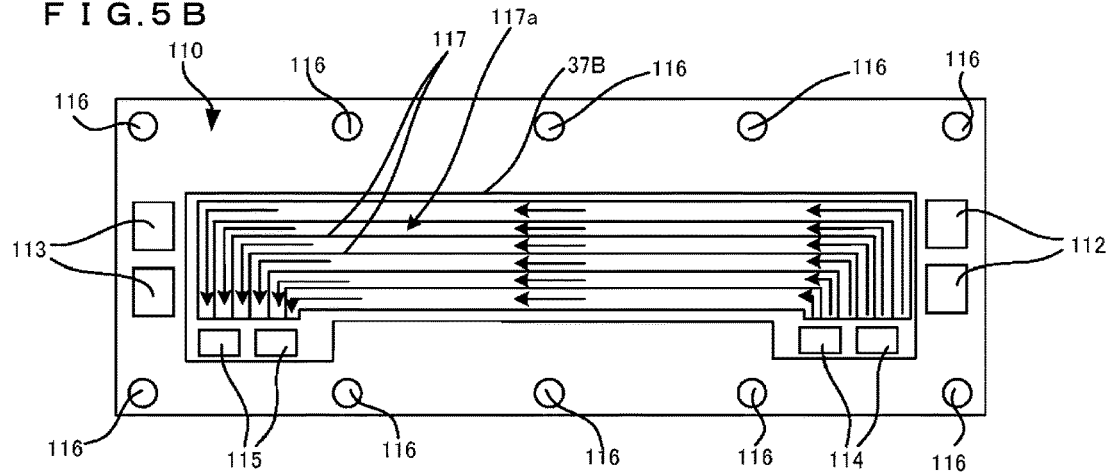
FIG. 5B is a plan view illustrating a back face of a separator.
Figure 6:
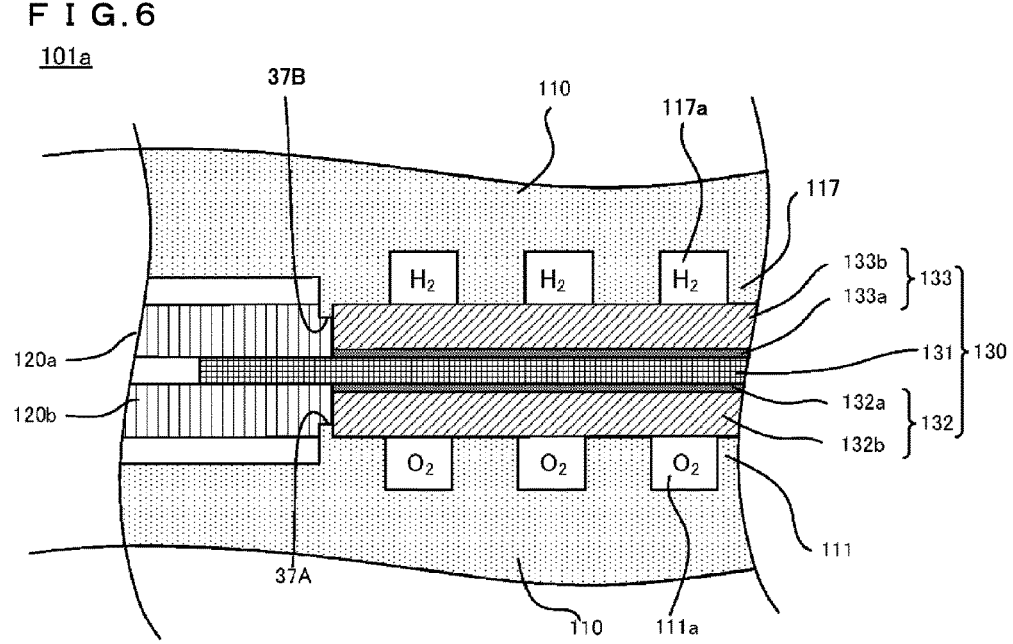
FIG. 6 is a sectional partial view illustrating a configuration of a unit battery cell.

As illustrated in FIGS. 4 to 6, each unit battery cell 101a constituting the stack 100 includes a membrane/electrode assembly 130, two gaskets 120a and 120b, and two separators 110. The two gaskets 120a and 120b are individually provided in the peripheral edge part of the membrane/electrode assembly 130. One of the two separators 110 is in contact with one face of the membrane/electrode assembly 130 with a gasket 120a in between. The other one of the two separators 110 is in contact with other face of the membrane/electrode assembly 130 with a gasket 120b in between.

<<<Membrane/Electrode Assembly>>>

As illustrated in FIG. 6, the membrane/electrode assembly 130 includes an electrolyte membrane 131, a cathode electrode 132, and an anode electrode 133. The electrolyte membrane 131 has an electrical conductivity for protons. In a moisture state, the electrolyte membrane 131 selectively transports protons. For example, the electrolyte membrane 131 is constructed from a fluorine-based polymer such as Nafion (registered tradename) having a sulfonic acid group.

The anode electrode 133 is in contact with one face of the electrolyte membrane 131. The anode electrode 133 includes a catalyst layer 133a and a gas diffusion layer 133b. The gas diffusion layer 133b has both an electrical conductivity and a permeability for the fuel gas (e.g., hydrogen). For example, the gas diffusion layer 133b is constructed from carbon paper or the like. The catalyst layer 133a is provided between one face of the electrolyte membrane 131 and the gas diffusion layer 133b. The catalyst layer 133a contains a catalyst composed mainly of carbon powder carrying a platinum-based metal catalyst. For example, the catalyst layer 133a is formed such that a paste obtained by dispersing the catalyst into an organic solvent is applied on the carbon paper constituting the gas diffusion layer 133b.

The cathode electrode 132 is in contact with the other face of the electrolyte membrane 131. The cathode electrode 132 has a catalyst layer 132a and a gas diffusion layer 132b. The gas diffusion layer 132b has an electrical conductivity and a permeability for the oxidation gas (e.g., air), For example, the gas diffusion layer 132b is constructed from carbon paper or the like. The catalyst layer 132a is provided between the other face of the electrolyte membrane 131 and the gas diffusion layer 132b. The catalyst layer 132a contains a catalyst composed mainly of carbon powder carrying a platinum-based metal catalyst. For example, the catalyst layer 132a is formed such that a paste obtained by dispersing the catalyst into an organic solvent is applied on the carbon paper constituting the gas diffusion layer 132b.

<<<Separator>>>

The separator 110 is a flat-plate shaped member having a rectangular shape and fabricated from metal. For example, the separator 110 is constructed from aluminum, stainless steel, carbon, or the like. The separator 110 includes: a plurality of first passage walls 111, a plurality of second passage walls 117, two first through holes 112, two second through holes 113, two third through holes 114, and two fourth through holes 115 is included.

As illustrated in FIGS. 4, 5A, and 5B, in the center in one face (e.g., the front face) of the separator 110, the plurality of first passage walls 111 are provided in parallel to each other with intervals in between. A substantially rectangular region encompassing all first passage walls 111 corresponds to the outer shape of the cathode electrode 132. The individual first passage walls 111 and the cathode electrode 132 in contact with the top parts of the individual first passage walls 111 constitute the plurality of first passages 111a through which the air supplied to the electrolyte membrane 131 flows. At particular-side ends of the first passages 111a, the two first through holes 112 are provided along the short side of the separator 110. Further, at the other ends of the first passages 111a, the two second through holes 113 are provided along the short side of the separator 110. The air having passed through the first through holes 112 flows through the first passages 111a so as to be supplied to the cathode electrode 132. The air having flowed through the first passages 111a, together with the water generated by the cathode electrode 132, passes through the second through holes 113. A gasket line 37A protruding in the thickness direction is formed in the front face of the separator 110. The gasket line 37A encompasses without a space the outer periphery of the plurality of first passages 111a, the two first through holes 112, and the two second through holes 113.

Further, in the center in the other face (e.g., the back face) of the separator 110, similarly to the front face, the plurality of second passage walls 117 are provided in parallel to each other with intervals in between. In contrast to the passage walls 111 having a straight type in the front face, the plurality of second passage walls 117 have a serpentine shape that both ends thereof are bent at right angles respectively toward the third through holes 114 and toward the fourth through holes 115. A substantially rectangular region encompassing the plurality of second passage walls 117 corresponds to the outer shape of the anode electrode 133. The individual second passage walls 117 and the anode electrode 133 in contact with the top parts of the individual second passage walls 117 constitute the plurality of second passages 117a through which the hydrogen supplied to the electrolyte membrane 131 flows. The hydrogen having passed through the third through holes 114 flows through the second passages 117a so as to be supplied to the anode electrode 133. The hydrogen having flowed through the second passages 117a passes through the fourth through holes 115. Similarly to the front face, a gasket line 37B protruding in the thickness direction is formed in the back face of the separator 110. The gasket line 37B encompasses without a space the outer periphery of the plurality of second passages 117a, the two third through holes 114, and the two fourth through holes 115.

In the vicinity of each of the long sides of the separator 110 opposing each other, a plurality of insertion holes 116 are provided at equal intervals. In the present embodiment, for the purpose of improvement of the strength of the separator 110, the third through holes 114 and the fourth through holes 115 are provided in a region between two adjacent insertion holes 116.

<<<Gasket>>>

The gaskets 120a and 120b are each constructed from a rectangular sheet material having substantially the same size as the separator 110. The gaskets 120a and 120b have through holes 121 to 126. As the sheet material employed for the gaskets 120a and 120b, for example, an elastic material such as a silicone rubber and an elastomer formed remarkably thin may be employed. In the center of each gasket 120a or 120b, a largest rectangular through hole 121 is provided. The outer shape and the position of the through hole 121 corresponds to a substantially rectangular region encompassing the first passage walls 111 formed in the front face of the separator 110 and the second passage walls 117 formed in the back face of the separator 110. Further, the outer shape of the through hole 121 corresponds also to the cathode electrode 132 and the anode electrode 133 provided in the two faces of the electrolyte membrane 131.

At both ends of the rectangular through hole 121 in the vicinity of each of the short sides opposing each other in each gasket 120a or 120b, two through holes 122 and two through holes 123 are provided. The outer shapes and the positions of the two through holes 122 respectively correspond to those of the two first through holes 112 of the separator 110. Further, the outer shapes and the positions of the two through holes 123 respectively correspond to those of the two second through holes 113 of the separator 110.

The in the vicinity of a long side of each gasket 120a or 120b, two through holes 124 and two through holes 125 are provided with intervals in between. The outer shapes and the positions of the two through holes 124 respectively correspond to those of the two third through holes 114 of the separator 110. Further, the outer shapes and the positions of the two through holes 125 respectively correspond to those of the two fourth through holes 115 of the separator 110.

In the vicinity of each of the long sides opposing each other in each gasket 120a or 120b, a plurality of through holes 126 are provided at equal intervals. The outer shapes and the positions of the through holes 126 respectively correspond to those of the individual through holes 116 of the separator 110.

As illustrated in FIGS. 4 and 6, the gasket 120a is adjacent to the outer periphery of the anode electrode 133 and in contact with one face of the electrolyte membrane 131. The gasket 120a is pressed down by the gasket line 37B formed in the back face of the separator 110. The gasket 120a avoids a situation that the hydrogen flowing through the second passages 117a leaks from the unit battery cell 101a to the outside. The gasket 120b is adjacent to the outer periphery of the cathode electrode 132 and in contact with the other face of the electrolyte membrane 131. The gasket 120b is pressed down by the gasket line 37A formed in the front face of the separator 110. The gasket 120b avoids a situation that the air flowing through the first passages 111a leaks from the unit battery cell 101a to the outside.

In FIGS. 3 and 4, since the plurality of unit battery cells 101a are directly stacked, the first through holes 112 and the through holes 122 align in straight lines. Similarly, the third through holes 114 and the through holes 124; the second through holes 113 and the through holes 123; and the fourth through holes 115 and the through holes 125, respectively align in straight lines. The hydrogen inlet hole 101E of one end plate 101B is in fluid communication with the third through holes 114 and the through holes 124 aligned in straight lines. The air inlet hole 101D of the one end plate 101B is in fluid communication with the first through holes 112 and the through holes 122 aligned in straight lines. The hydrogen discharge hole (not illustrated) of the other end plate 101B is in fluid communication with the fourth through holes 115 and the through holes 125 aligned in straight lines. The air discharge hole (not illustrated) of the other end plate 101B is in fluid communication with the second through holes 113 and the through holes 123 aligned in straight lines.

<<Operation of Fuel Cell>>

The hydrogen having been supplied through the hydrogen inlet hole 101E to the inside of the stack 100 flows into the third through holes 114 aligned in straight lines in the stacking direction. The hydrogen flows through the third through holes 114 into the second passages 117a. The hydrogen having flowed into the second passages 117a diffuses in the plane direction of the membrane/electrode assembly 130 along the gas diffusion layer 133b of the anode electrode 133 so as to go into contact with the catalyst layer 133a of the anode electrode 133. The hydrogen in contact with the catalyst layer 133a is dissociated into hydrogen ions and electrons by the catalyst contained in the catalyst layer 133a. The hydrogen ions are conducted through the electrolyte membrane 131 so as to reach the catalyst layer 132a of the cathode electrode 132. On the other hand, the electrons are extracted through the collecting electrode plate 101F to the outside. The hydrogen gas in contact with the anode electrode 133 goes along the second passages 117a so as to reach the fourth through holes 115 and is then discharged through the hydrogen discharge hole (not illustrated) to the outside of the stack 1.

The air having been supplied through the air inlet hole 101D to the inside of the stack 100 flows into the first through holes 112 aligned in straight lines in the stacking direction. The air flows through the first through holes 112 into the first passages 111a. The air having flowed into the first passages 111a diffuses in the plane direction of the membrane/electrode assembly 130 along the gas diffusion layer 132b of the cathode electrode 132 so as to go into contact with the catalyst layer 132a of the cathode electrode 132. The oxygen contained in the air reacts with the hydrogen ions having been conducted through the electrolyte membrane 131 and with the electrons having been extracted through the collecting electrode plate 101F and then conducted from the collecting electrode plate 101G via the external load, by virtue of the catalyst contained in the catalyst layer 132a so that water is generated. As a result of this electron transfer, electric power is obtained. The air in contact with the cathode electrode 132, together with the generated water, goes along the first passages 111a so as to reach the second through holes 113 and is then discharged through the air discharge hole (not illustrated) to the outside of the stack 1.

<<Auxiliary Devices of Fuel Cell>>

As illustrated in FIG. 1, the fuel cell 6 includes various auxiliary devices for causing the stack 100 to perform power generation. As described above, each solid line in FIG. 1 indicates a supply route of electric power. Each dashed line in FIG. 1 indicates a transmission route for a signal such as a detection result and an instruction. Each auxiliary device of the fuel cell 6 and the system control board 7 are electrically connected to each other through each transmission route indicated by a solid line in FIG. 1. Transmisand reception of a signal is allowed through each transmission route indicated by a dashed line.

As described above, the air pump 61 is arranged in the air passage member 20 (see FIG. 2) connected to the cathode-side inlet of the stack 100. The air pump 61 is electrically connected to a pump drive circuit 81 of the system control board 7. The pump drive circuit 81 is electrically connected to an auxiliary device power supply 75 (this connection is not illustrated). A direct current from the auxiliary device power supply 75 is supplied through the pump drive circuit 81 to the air pump 61. The pump drive circuit 81 performs ON/OFF operation of the air pump 61 in response to an instruction (e.g., a signal) from the system control part 71.

The flowmeter 61a detects the flow rate of the air supplied from the air pump 61. The flowmeter 61a transmits a signal representing the detection result to the system control part 71 of the system control board 7. The configuration of the flowmeter 61a is not limited to a particular one. For example, as the flowmeter 61a, a flowmeter of thermal type, differential pressure type, area type, ultrasonic type, or the like may be employed. The flowmeter 61a of the present embodiment is a flowmeter of thermal type employing a thermistor.

A temperature sensor 62a, the MH heater 62b, and the pressure regulator 62c are provided in the MH tank 62. The temperature sensor 62a is directly or indirectly in contact with the MH tank 62 so as to detect the temperature of the MH tank 62. The temperature sensor 62a transmits a signal representing the detection result to the system control part 71. Employable as the temperature sensor 62a are: a resistance temperature sensor of platinum, thermistor, or the like; and a thermocouple. The MH heater 62b is electrically connected to a heater drive circuit 84 of the system control board 7. The heater drive circuit 84 is electrically connected to the first power feed line L1. An alternating current from the commercial alternating current power source 2 is supplied through the heater drive circuit 84 to the MH heater 62b. The heater drive circuit 84 performs ON/OFF operation of the MH heater 62b in response to an instruction (e.g., a signal) from the system control part 71. If the MH heater 62b is ON, an electric current flows through the MH heater 62b so that the MH heater 62b generates heat. For example, the MH heater 62b is a heating wire generating heat by virtue of the electric current flowing therethrough.

A hydrogen absorbing alloy contained in the MH tank 62 releases hydrogen by an endothermic reaction. When the temperature of the hydrogen absorbing alloy becomes lower than a reference value, a sufficient rate of hydrogen is not released. The system control part 71 compares with the reference value the temperature of the MH tank 62 detected by the temperature sensor 62a and then transmits an instruction of performing ON/OFF operation of the MH heater 62b to the heater drive circuit 84. In the present embodiment, the reference value is set to be 15° C. If the temperature of the MH tank 62 indicated by the signal received from the temperature sensor 62a is at or below 15° C., the system control part 71 transmits an instruction of turning ON the MH heater 62b to the heater drive circuit 84. On the other hand, if the temperature of the MH tank 62 indicated by the signal received from the temperature sensor 62a is not at or below 15° C., the system control part 71 transmits an instruction of turning OFF the MH heater 62b to the heater drive circuit 84.

The pressure regulator 62c adjusts the pressure in the hydrogen passage member 10 illustrated in FIG. 2, such as to become a reference value. That is, on the basis of the instruction of the system control part 71, the pressure regulator 62c controls the flow rate of the hydrogen supplied from the MH tank 62 to the hydrogen passage member 10. The reference value is a value for the pressure in the hydrogen passage member 10 sufficient for the power generation of the stack 100. For example, in the present embodiment, the reference value is set to be 50 kPa or higher. As illustrated in FIG. 2, a pressure sensor 62d is arranged in the hydrogen passage member 10. The system control part 71 compares with a reference value the pressure in the hydrogen passage member 10 detected by the pressure sensor 62d. If the pressure in the hydrogen passage member 10 indicated by the signal received from the pressure sensor 62d is less than 50 kPa, the system control part 71 transmits an instruction of operating the pressure regulator 62c to the pressure regulator 62c.

The plurality of control valves 63 illustrated in FIG. 1 correspond to the first control valve 63A, the second control valve 63B, the third control valve 63C, the fourth control valve 63D, and the fifth control valve 63E illustrated in FIG. 2. As illustrated in FIG. 2, the plurality of control valves 63 are arranged individually in the hydrogen passage member 10, the air passage member 20, and the substitution passage member 30 connected to the stack 100. The plurality of control valves 63 are electrically connected to a control valve drive circuit 82 of the system control board 7. The control valve drive circuit 82 is electrically connected to the auxiliary device power supply 75 (this connection is not illustrated). A direct current from the auxiliary device power supply 75 is supplied through the control valve drive circuit 82 to each control valve 63. The control valve drive circuit 82 performs opening or closing operation of each control valve 63 in response to an instruction (e.g., a signal) from the system control part 71.

As illustrated in FIG. 1, the plurality of control valves 63 are each provided with a temperature sensor 63a and a control valve heater 63b. The temperature sensor 63a detects the surrounding temperature of the control valve 63. The temperature sensor 63a transmits a signal representing the detection result to the system control part 71. Employable as the temperature sensor 63a are: a resistance temperature sensor of platinum, thermistor, or the like; and a thermocouple.

The control valve heater 63b is electrically connected to the heater drive circuit 84 of the system control board 7. The heater drive circuit 84 is electrically connected to the first power feed line L1. An alternating current from the commercial alternating current power source 2 is supplied through the heater drive circuit 84 to the control valve heater 63b. The heater drive circuit 84 performs ON/OFF operation of the control valve heater 63b in response to an instruction (e.g., a signal) from the system control part 71.

When the fuel cell 6 is operating, water is generated in association with power generation. Thus, a possibility arises that waterdrops are collected in the control valve 63. When the waterdrops collected in the control valve 63 freeze, the control valve 63 does not become open at the next time of starting the fuel cell 6. The system control part 71 compares with a reference value the surrounding temperature of the control valve 63 detected by the temperature sensor 63a and then transmits an instruction of performing ON/OFF operation of the control valve heater 63b to the heater drive circuit 84. In the present embodiment, the reference value is set to be 5° C. If the temperature of the control valve 63 indicated by the signal received from the temperature sensor 63a is at or below 5° C., the system control part 71 transmits an instruction of turning ON the control valve heater 63b to the heater drive circuit 84. On the other hand, if the temperature indicated by the signal received from the temperature sensor 63a is above 5° C., the system control part 71 transmits an instruction of turning OFF the control valve heater 63b to the heater drive circuit 84. For example, the control valve heater 63b may be constructed from a sheet-shaped heater glued on a wall surface of a containing part of the control valve 63. This sheet-shaped heater maintains the temperature in the containing part of the control valve 63 to be at or above 5° C. For example, the control valve heater 63b may be constructed from a heating wire generating heat by virtue of the electric current flowing therethrough.

The temperature sensor 64a illustrated in FIG. 1 is provided in the vicinity of an end part of the hydrogen passage member 10 connected to the anode-side outlet of the stack 100 illustrated in FIG. 2 and in the vicinity of an end part of the air passage member 20 connected to the cathode-side outlet of the stack 100. The temperature sensor 64a detects the temperature of the gas discharged from the stack 100. The temperature sensor 64a transmits a signal representing the detection result to the system control part 71.

A housing (not illustrated) of the alternating current uninterruptible power supply system 1 is provided with a cooling fan 65 and a housing inside temperature detection part 66a illustrated in FIG. 1. The cooling fan 65 is electrically connected to a fan drive circuit 83 of the system control board 7. The fan drive circuit 83 is electrically connected to the auxiliary device power supply 75. A direct current from the auxiliary device power supply 75 is supplied through the fan drive circuit 83 to the cooling fan 65. The fan drive circuit 83 performs ON/OFF operation in response to an instruction (e.g., a signal) of the system control part 71. When the cooling fan 65 goes ON, an electric current is supplied to the cooling fan 65 and hence the cooling fan 65 supplies wind to the stack 100. The stack 100 is cooled by the wind supplied from the cooling fan 65.

The housing inside temperature detection part 66a detects the temperature of the inside of the housing. The housing inside temperature detection part 66a transmits a signal representing the detection result to the system control part 71. When the temperature of the inside of the housing containing the fuel cell 6 goes higher than a reference value, the pressure in the MH tank 62 goes excessively high. The system control part 71 compares with a reference value the temperature of the inside of the housing detected by the housing inside temperature detection part 66a and then performs ON/OFF operation of the cooling fan 65. In the present embodiment, the reference value is set to be 40° C. If the temperature of the inside of the housing indicated by the signal received from the housing inside temperature detection part 66a is at or above 40° C., the system control part 71 transmits an instruction of turning ON the cooling fan 65 to the fan drive circuit 83. On the other hand, if the temperature indicated by the signal received from the housing inside temperature detection part 66a is not at or above 40° C., the system control part 71 transmits an instruction of turning OFF the cooling fan 65 to the fan drive circuit 83.

<System Control Board>

The system control board 7 includes a system control part 71, a non-volatile memory 72, a display part 73, a control board power supply 74, an auxiliary device power supply 75, an electric current/voltage detection part 76, a cutoff circuit 77, a power circuit 78, an electric current/voltage detection part 79, a pump drive circuit 81, a control valve drive circuit 82, a fan drive circuit 83, and a heater drive circuit 84. As described above, each solid line in FIG. 1 indicates a supply route of electric power. Each dashed line in FIG. 1 indicates a transmission route for a signal such as a detection result and an instruction. The components of the system control part 71 are electrically connected to each other through each transmission route indicated by a solid line in FIG. 1. Transmission and reception of a signal is allowed through each transmission route indicated by a dashed line in FIG. 1.

For example, the system control part 71 is constructed from: one or a plurality of CPUs (Central Processing Units) or, alternatively, a multi-core CPU; and a RAM (Random Access Memory). Further, the system control part 71 may be constructed from a dedicated circuit board for executing control processing described later. Further, the system control part 71 may be constructed from a dedicated ASIC (Application Specific Integrated Circuit) for executing control processing described later. The system control part 71 performs general control processing of the alternating current uninterruptible power supply system 1 in a normal situation and at the time of power failure. In a normal situation, for example, the system control part 71 performs: start control of the alternating current uninterruptible power supply system 1; monitoring of power failure; charging control of the battery 8 by using the electric power from the commercial alternating current power source 2; temperature control of the MH tank 62; temperature control of the control valve 63; temperature control of the inside of the housing; and the like. At the time of power failure, the system control part 71 performs: detection of power failure; control of the switchover relay 3; start control of the fuel cell 6; charging control of the battery 8 by using the electric power from the fuel cell 6; detection of power resumption; stop control of the fuel cell 6; and the like.

Here, the voltage detection part 71a is electrically connected to the first power feed line L1. On the basis of the voltage of the commercial alternating current power source 2 applied on the first power feed line L1, the voltage detection part 71a outputs a pulse signal. The voltage detection part 71a is electrically connected to the system control part 71. On the basis of the pulse signal of the voltage detection part 71a, the system control part 71 detects power failure and power resumption of the commercial alternating current power source 2. A detection method for power failure and power resumption is described later in detail with reference to FIGS. 8A and 8B.

The system control part 71 transmits a first instruction and a second instruction (e.g., signals) to the switchover relay 3. The first instruction is an instruction of bringing the contact of the switchover relay 3 into a state (referred to as a "first state", hereinafter) that the first input part 3a and the output part 3c are connected to each other. The second instruction is an instruction of bringing the contact of the switchover relay 3 into a state (referred to as a "second state", hereinafter) that the second input part 3b and the output part 3c are connected to each other. In a normal situation that electric power is being supplied from the commercial alternating current power source 2, the contact of the switchover relay 3 is in the first state. If power failure is detected, the system control part 71 transmits a second instruction to the switchover relay 3. The switchover relay 3 having received the second instruction switches the contact from the first state to the second state. By virtue of this, the electric power supply route of the load R is switched from the first power feed line L1 to the second power feed line L2. When the contact of the switchover relay 3 is in the second state, the electric power from the battery 8 or the fuel cell 6 is supplied through the second power feed line L2 to the load R.

On the other hand, if power resumption is detected, the system control part 71 transmits a first instruction to the switchover relay 3. The switchover relay 3 having received the first instruction switches the contact from the second state to the first state. By virtue of this, the electric power supply route to the load R is switched from the second power feed line L2 to the first power feed line L1. When the contact of the switchover relay 3 is in the first state, the electric power from the commercial alternating current power source 2 is supplied through the first power feed line L1 to the load R.

Here, the alternating current uninterruptible power supply system 1 of the present embodiment has a configuration that the single system control part 71 performs the main control processing of the present system. However, the alternating current uninterruptible power supply system of the present disclosure is not limited to a configuration employing a single control part. The alternating current uninterruptible power supply system of the present disclosure may have a configuration that a plurality of control parts perform the main control processing of the present system.

In accordance with the control processing of the system control part 71, the non-volatile memory 72 stores various data concerning the operation of the alternating current uninterruptible power supply system 1. For example, the display part 73 may be constructed from a liquid crystal display panel, a seven-segment LED, or the like. In accordance with the control processing of the system control part 71, the display part 73 displays information such as characters and symbols.

In a normal situation, the control board power supply 74 converts the electric power from the commercial alternating current power source 2 into a voltage allowed to be used in the system control board 7 and then supplies the electric power to the system control board 7. In a normal situation, the auxiliary device power supply 75 converts the electric power from the commercial alternating current power source 2 into a voltage allowed to be used in the auxiliary devices of the fuel cell 6 and then supplies the electric power to the auxiliary devices. At the time of power failure the electric power from the battery 8 or the fuel cell 6 is supplied through the second power feed line L2 to the control board power supply 74 and the auxiliary device power supply 75.

The electric power from the fuel cell 6 at the time of power failure flows through the electric current/voltage detection part 76, the cutoff circuit 77, the power circuit 78, and the electric current/voltage detection part 79 into the second power feed line L2. The electric current/voltage detection part 76 is connected to the output side of the stack 100. The electric current/voltage detection part 76 detects the electric current value and the voltage value of the electric power generated by the stack 100. The electric current/voltage detection part 76 transmits signals representing the detection results to the system control part 71.

The electric current value of the stack 100 indicates the consumption rate of the hydrogen used in the power generation. As described above, in the fuel cell 6, hydrogen ions and electrons obtained by dissociation of the hydrogen are reacted with oxygen contained in the air so that water is generated. Then, electric power is generated by the electron transfer at that time. The rate of electrons having transferred in the power generation corresponds to the electric current value of the stack 100 and also corresponds to the consumption rate of the hydrogen used in the power generation. On the basis of the electric current value of the stack 100 received from the electric current/voltage detection part 76, the system control part 71 calculates the hydrogen residual amount in the MH tank 62. The value of hydrogen residual amount calculated by the system control part 71 is stored into the non-volatile memory 72. Further, if the hydrogen residual amount in the MH tank 62 approaches zero, the system control part 71 transmits an instruction of displaying corresponding information to the display part 73 so as to display given information on the display part 73. Further, on the basis of the electric current value of the stack 100, the system control part 71 transmits an instruction of changing the rate of air supply to the air pump 61.

On the other hand, the voltage value of the stack 100 has a correlation with the lifetime of the stack 100. For example, when the membrane quality of the electrolyte membrane 131 illustrated in FIG. 6 becomes thin owing to aged deterioration, the cross leaks rate increases. Further, when the platinum catalyst contained in the catalyst layers 132a and 133a illustrated in FIG. 6 are degraded, the reaction efficiencies in the catalyst layers 132a and 133a decrease. As a result of such factors, the output voltage of the stack 100 decreases as time progresses. Thus, the decrease in the voltage value of the stack 100 indicates degradation of the components such as the electrolyte membrane 131 and the catalyst layers 132a and 133a. Thus, on the basis of the voltage value of the stack 100, the system control part 71 determines the lifetime of the stack 100. If the lifetime of the stack 100 approaches zero, the system control part 71 transmits an instruction of displaying corresponding information to the display part 73 so as to display given information on the display part 73.

In a normal situation that the stack 100 is not performing power generation, the cutoff circuit 77 electrically shuts off the stack 100 from the system control board 7. This is performed for the purpose of avoiding a situation that the electric power supplied from the commercial alternating current power source 2 to the system control board 7 flows into the stack 100. At the time of start of the fuel cell 6, in response to an instruction (e.g., a signal) from the system control part 71, the cutoff circuit 77 cancels the electrical shut-off between the stack 100 and the system control board 7.

In response to an instruction (e.g., a signal) from the system control part 71, the power circuit 78 performs charging of the battery 8 in a constant current constant voltage (CCCV) mode or a constant voltage constant current (CVCC) mode. The voltage of the stack 100 fluctuates in association with an increase or decrease in the power consumption of the load R. The power circuit 78 smoothes the electric current and the voltage of the stack 100 supplied to the battery 8. Further, for example, the power circuit 78 maintains the electric current of the stack 100 at a fixed value and then, after the voltage of the battery 8 reaches a reference value, decreases the electric current value of the stack 100 in order that the voltage may be maintained at the reference value. Further, the power circuit 78 converts into a fixed value the voltage supplied from the stack 100 to the inverter 9. For example, in the present embodiment, the voltage of the stack 100 fluctuates within a range from 30 to 50 V. The power circuit 78 converts the voltage of the stack 100 into 24 V equal to the output voltage of the battery 8.

The electric current/voltage detection part 79 detects the electric current and the voltage of the electric power supplied through the power circuit 78 to the battery 8. The electric current/voltage detection part 79 transmits signals representing the detection results to the system control part 71. On the basis of the electric current value detected by the electric current/voltage detection part 79, the system control part 71 calculates the charging amount of the battery 8. Further, on the basis of the voltage value detected by the electric current/voltage detection part 79, the system control part 71 monitors the voltage value of the battery 8.

As described above, on the basis of the instruction from the system control part 71, the pump drive circuit 81 performs ON/OFF operation of the air pump 61 of the fuel cell 6. The pump drive circuit 81 is electrically connected to the auxiliary device power supply 75 (this connection is not illustrated). A direct current from the auxiliary device power supply 75 is supplied to the pump drive circuit 81. For example, the instruction of the system control part 71 is a control signal generated by ON/OFF operation of a transistor. When the system control part 71 transmits the control signal to the pump drive circuit 81, the electric current supply from the pump drive circuit 81 to the air pump 61 is started or stopped.

As described above, on the basis of the instruction from the system control part 71, the control valve drive circuit 82 performs opening or closing operation of each of the plurality of control valves 63 (the first to the fifth control valve 63A to 63E in FIG. 2) arranged in the pipes of the fuel cell 6. The control valve drive circuit 82 is electrically connected to the auxiliary device power supply 75 (this connection is not illustrated). A direct current from the auxiliary device power supply 75 is supplied to the control valve drive circuit 82. For example, the instruction of the system control part 71 is a control signal generated by ON/OFF operation of a transistor. When the system control part 71 transmits the control signal to the control valve drive circuit 82, the electric current supply from the control valve drive circuit 82 to the plurality of control valves 63 is started or stopped.

As described above, on the basis of the instruction from the system control part 71, the fan drive circuit 83 performs ON/OFF operation of the cooling fan 65. The fan drive circuit 83 is electrically connected to the auxiliary device power supply 75 (this connection is not illustrated). A direct current from the auxiliary device power supply 75 is supplied to the fan drive circuit 83. For example, the instruction of the system control part 71 is a control signal generated by ON/OFF operation of a transistor. When the system control part 71 transmits the control signal to the fan drive circuit 83, the electric current supply from the fan drive circuit 83 to the cooling fan 65 is started or stopped.

As described above, on the basis of the instruction from the system control part 71, the heater drive circuit 84 performs ON/OFF operation of the MH heater 62b and the control valve heater 63b. The heater drive circuit 84 is electrically connected to the first power feed line L1. An alternating current from the commercial alternating current power source 2 is supplied to the heater drive circuit 84. For example, the instruction of the system control part 71 is a control signal generated by ON/OFF operation of a transistor. When the system control part 71 transmits the control signal to the heater drive circuit 84, the electric current supply from the heater drive circuit 84 to the MH heater 62b and the control valve heater 63b is started or stopped.

<Battery>

In a normal situation, the battery 8 is charged with the electric power supplied from the commercial alternating current power source 2. On the other hand, at the time of power failure, when the fuel cell 6 is not operating, the battery 8 supplies electric power through the control board power supply 74 and the auxiliary device power supply 75 to the system control board 7, the auxiliary devices of the fuel cell 6, and the load R. Further, at the time of power failure, when the fuel cell 6 is operating, the battery 8 is charged with the electric power supplied from the fuel cell 6. In the alternating current uninterruptible power supply system 1 of the present embodiment, until a reference time elapses after the occurrence of power failure of the commercial alternating current power source 2, the battery 8 supplies the electric power. For example, in the alternating current uninterruptible power supply system 1 of the present embodiment, this reference time is set to be 10 seconds. When the power has not resumed even after 10 seconds has elapsed, the fuel cell 6 is started. That is, the fuel cell 6 is not started in the case of a short power failure of 10 seconds or the like. Such a short power failure of 10 seconds or the like is treated by the electric power of the battery 8. The reference time of 10 seconds described here is an example of the second time adopted as a reference value employed for starting the power generation of the stack 100. The battery 8 is a secondary battery allowed to be charged. In the present embodiment, as the battery 8, a lead storage battery having an output voltage of 24 V is employed. However, the employed battery 8 may be another secondary battery such as a lithium ion battery and a nickel-hydrogen battery. Further, the output voltage of the battery 8 is not limited to 24 V and arbitrary another voltage (e.g., 12V) may be employed.

A temperature sensor 8a is provided in the battery 8. The temperature sensor 8a detects the temperature of the battery 8. The temperature sensor 8a transmits a signal representing the detection result to the system control part 71. If the temperature of the battery 8 detected by the temperature sensor 8a exceeds a reference value, the system control part 71 stops the charging of the battery 8. In the alternating current uninterruptible power supply system 1, for example, this reference value is set to be 40° C. Here, for example, excessive heat generation in the battery 8 is allowed to be avoided when outside air is always taken into the housing (not illustrated) of the alternating current uninterruptible power supply system 1.

<Inverter and Switchover Relay>

The inverter 9 converts from a direct current into an alternating current the electric power supplied from the battery 8 or the fuel cell 6 via the second power feed line L2. For example, the inverter 9 is a DC/AC inverter allowed to convert a direct-current voltage of 24 V outputted from the battery 8 or the fuel cell 6, into an alternating voltage of 100 V equal to that of the commercial power source.

Figure 8A:
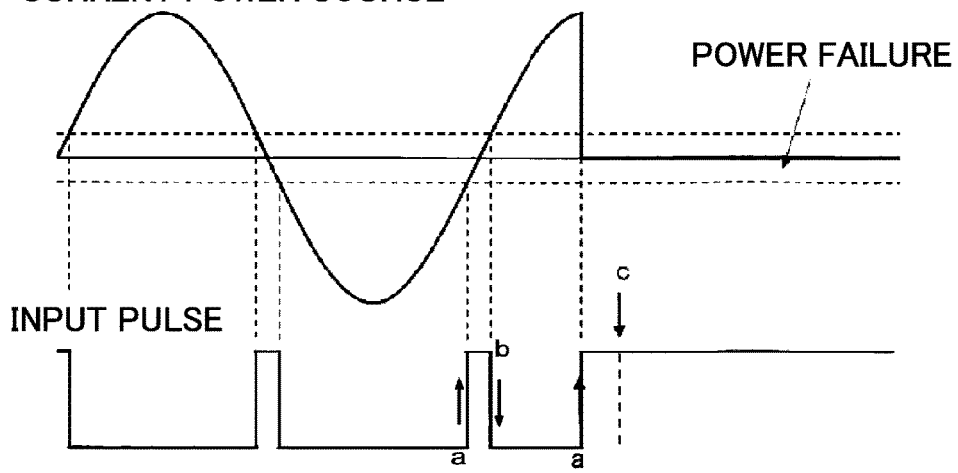
FIG. 8A is a time chart illustrating power failure detection in an alternating current uninterruptible power supply system.

As described above, the switchover relay 3 receives the first instruction of the system control part 71 and thereby brings the contact into the first state (a state that the first input part 3a and the output part 3c are connected to each other). Further, the switchover relay 3 receives the second instruction of the system control part 71 and thereby switches the contact from the first state to the second state (a state that the second input part 3b and the output part 3c are connected to each other). When the contact of the switchover relay 3 is in the first state, the electric power from the commercial alternating current power source 2 is supplied through the first power feed line L1 to the load R. Further, when the contact of the switchover relay 3 is in the second state, the electric power supplied from the battery 8 or the fuel cell 6 is supplied through the second power feed line L2 and the inverter 9 to the load R. Here, for example, the first instruction and the second instruction transmitted from the system control part 71 to the switchover relay 3 are two signals having different voltage values from each other. As illustrated in FIG. 8A, the first instruction is a first signal L having a voltage value of 0 V. The second instruction is a second signal H having a voltage value higher than 0 V. For example, the voltage value of the second signal H is set to be 10 V.

In the alternating current uninterruptible power supply system 1 of the present embodiment, a configuration is adopted that the inverter 9 is connected to the second power feed line L2. Thus, the inverter 9 operates only at the time of power failure in which the contact of the switchover relay 3 is being switched from the first state to the second state. In a normal situation in which the contact of the switchover relay 3 is in the first state, the electric power from the commercial alternating current power source 2 is always supplied to the load R without intervention of the inverter 9. Since such a configuration is adopted in the alternating current uninterruptible power supply system 1 of the present embodiment, in comparison with a system that the electric power from the commercial alternating current power source 2 is AC/DC-converted and then the electric power is supplied to the load R always via the inverter 9, the operating time of the inverter 9 is allowed to be limited only to the time of power failure. Thus, the duration until a fault occurs in the inverter 9 is allowed to be extended.

<Control Processing of System>

Next, a flow of control processing of the alternating current uninterruptible power supply system 1 of the present embodiment is described below with reference to FIG. 7. The steps S1 to S19 illustrated in FIG. 7 are performed by the system control part 71 illustrated in FIG. 2. Here, as described above, a configuration may be employed that the steps S1 to S19 illustrated in FIG. 7 are performed by a plurality of control parts.

<<Outlines of Control Processing>>

After the alternating current uninterruptible power supply system 1 is started, at step S1, it is determined whether or not power failure of the commercial alternating current power source 2 has occurred. If it is concluded that power failure has not occurred (NO), the control of steps S2 to S11 for a normal situation is performed. On the other hand, if it is concluded that power failure has occurred (YES), the control of steps S12 to S19 for a situation of power failure (including the control posterior to power resumption) is performed. Unless occurrence of power failure is detected at step S1, the control of steps S2 to S11 for a normal situation is repeated.

For example, the control in a normal situation includes: the control concerning the charging of the battery 8 (step S2); and the control concerning the management of the auxiliary devices of the fuel cell 6 (steps S3 to S11). On the other hand, for example, the control in a situation of power failure includes: the switching control of the switchover relay 3 (steps S12, S14, and S18); the detection control of power resumption of the commercial alternating current power source 2 (steps S13 and S17); the start control of the fuel cell 6 (step S16); and the stop control of the fuel cell 6 (step S19).

In the alternating current uninterruptible power supply system 1 of the present embodiment, if the commercial alternating current power source 2 has not resumed (NO at step S13) and the reference time of 10 seconds has elapsed (YES at step S15), the fuel cell 6 is started (step S16). That is, the fuel cell 6 is started depending on the duration time of power failure. Here, for example, the measurement of time is achieved by using a function of time counting provided as the standard in the CPU constituting the system control part 71.

<<Start of System>>

The alternating current uninterruptible power supply system 1 is started by turning ON the power switch 5 illustrated in FIG. 2. When the alternating current uninterruptible power supply system 1 has been started, the electric power from the commercial alternating current power source 2 is supplied through the first power feed line L1 to the system control board 7 and the auxiliary devices of the fuel cell 6.

As described above, the switchover relay 3 receives the first instruction of the system control part 71 and thereby brings the contact into the first state (a state that the first input part 3a and the output part 3c are connected to each other). The first instruction of the system control part 71 is a first signal L having a voltage value of 0 V illustrated in FIG. 8A. Thus, in a normal situation, regardless of whether or not the alternating current uninterruptible power supply system 1 has been started, the switchover relay 3 maintains the first state. Then, regardless of whether or not the alternating current uninterruptible power supply system 1 has been started, the electric power from the commercial alternating current power source 2 in a normal situation is supplied through the first power feed line L1 to the load R.

<<Control of Power Failure Detection>>

At step S1 in FIG. 7, the system control part 71 determines whether or not power failure of the commercial alternating current power source 2 has occurred. The time chart of FIG. 8A illustrates a specific example of control of power failure detection at step S1. The "commercial alternating current power source" in FIG. 8A indicates the alternating voltage waveform of the commercial alternating current power source 2. The "input pulse" in FIG. 8A indicates the pulse signal inputted from the voltage detection part 71a to the system control part 71. The "relay switchover signal" in FIG. 8A indicates the first signal L and the second signal H transmitted from the system control part 71 to the switchover relay 3. In the present embodiment, the first signal L is set to be 0 V and the second signal H is set to be 10 V.

In the alternating current uninterruptible power supply system 1 of the present embodiment, in order that the switching of the switchover relay 3 may be completed within 10 ms posterior to the occurrence of power failure, interrupt processing of 8-bit Timer 1-Compare Match A is adopted. The voltage detection part 71a detects zero crossing of the voltage of the commercial alternating current power source 2 and then outputs a pulse signal. That is, the voltage detection part 71a outputs a pulse signal at the time that the voltage value of the commercial alternating current power source 2 passes 0 V. Specifically, two horizontal dashed lines are drawn in the up and down of the horizontal solid line indicating the voltage value 0 V in FIG. 8A. Then, each of the two horizontal dashed lines indicates a given voltage value serving as a threshold. If the voltage value of the commercial alternating current power source 2 becomes equal to the threshold indicated by the two horizontal dashed lines in FIG. 8A, the voltage detection part 71a outputs a pulse signal indicated as the "input pulse" in FIG. 8A. The pulse signal rises before the voltage value of the commercial alternating current power source 2 passes 0 V and then falls after the voltage value passes 0 V.

The system control part 71 detects a rising edge "a" and a falling edge "b" of the pulse signal inputted from the voltage detection part 71a. At the time that the rising edge "a" is detected, the system control part 71 permits interruption and starts the timer. The "power failure occurrence" in the present embodiment is defined as a state that the system control part 71 has not received the falling edge b within 0.83 ms posterior to the start of the timer. The state that the falling edge b has not been received indicates a state that the pulse signal of the voltage detection part 71a remains high (see the part indicated by an arrow c in FIG. 8A) even after 0.83 ms has elapsed after the start of the timer. That is, the state that the falling edge b has not been received is a state that the supply of electric power from the commercial alternating current power source 2 to the first power feed line L1 has been shut off, in other words, a state that power failure has occurred.

At step S1, the system control part 71 determines whether or not the falling edge b has been received from the voltage detection part 71a within 0.83 ms posterior to the start of the timer. If it is determined that the falling edge b has not been received from the voltage detection part 71a within 0.83 ms posterior to the start of the timer (YES), that is, if power failure of the commercial alternating current power source 2 has occurred, the system control part 71 transmits the second signal H at 10 V to the switchover relay 3. By virtue of this, the contact of the switchover relay 3 is changed from the first state to the second state (a state that the second input part 3b and the output part 3c are connected to each other). As a result of such control processing of power failure detection, the second signal H is transmitted within 3 ms posterior to the occurrence of power failure so that the switching of the contact of the switchover relay 3 is completed within 10 ms posterior to the occurrence of power failure. The reference time of 0.83 ms in the present embodiment is an example of the first time for determining the presence or absence of power failure occurrence.

<<Control in Normal Situation>>

On the other hand, at step S1, if it is determined that the falling edge b has been received from the voltage detection part 71a within 0.83 ms posterior to the start of the timer (NO), that is, in the absence of power failure of the commercial alternating current power source 2, the system control part 71 proceeds the control processing to step S2. In a normal situation that power failure of the commercial alternating current power source 2 has not occurred, the battery 8 is charged with the electric power supplied from the commercial alternating current power source 2. At step S2, the system control part 71 starts the charging control of the battery 8 described above. That is, on the basis of the detection result of the temperature sensor 8a, the system control part 71 starts monitoring of the temperature of the battery 8. If the temperature of the battery 8 exceeds 40° C., the system control part 71 stops the charging of the battery 8.

Then, the system control part 71 proceeds the control processing to step S3. At step S3, on the basis of the detection result of the housing inside temperature detection part 66a, the system control part 71 determines whether or not the housing inside temperature is at or above 40° C. This is because when the housing inside temperature goes excessively high, the pressure in the MH tank 62 goes high and this situation is not preferable. Further, when the housing inside temperature goes excessively high, a possibility arises that the lifetime of the battery 8 or the system control board 7 is shortened.

At step S3, if it is determined that the housing inside temperature is at or above 40° C. (YES), the system control part 71 proceeds the control processing to step S4. At step S4, the system control part 71 transmits an instruction (e.g., a signal) of turning ON the cooling fan 65 to the fan drive circuit 83. On the basis of the instruction of the system control part 71, the fan drive circuit 83 starts electric current supply to the cooling fan 65. By virtue of this, the cooling fan 65 goes ON and hence the cooling fan 65 supplies wind to the fuel cell 6. After that, the system control part 71 proceeds the control processing to step S6.

On the other hand, at step S3, if it is determined that the housing inside temperature is not at or above 40° C. (NO), the system control part 71 proceeds the control processing to step S5. At step S5, the system control part 71 transmits an instruction (e.g., a signal) of stopping the cooling fan 65 to the fan drive circuit 83. As described above, unless occurrence of power failure is detected at step S1, the control of steps S2 to S11 for a normal situation is repeated. Thus, in some cases, the cooling fan 65 is ON as a result of the previous control at step S4. Then, in such a case, in response to the instruction of the system control part 71 at the step S5 of this time, the fan drive circuit 83 stops the electric current supply to the cooling fan 65. By virtue of this, the cooling fan 65 goes OFF and hence the cooling fan 65 stops the wind supply to the fuel cell 6. After that, the system control part 71 proceeds the control processing to step S6.

Here, at step S3 of the present embodiment, the ON/OFF operation of the cooling fan 65 is determined on the basis of the single reference value (40° C.) for the housing inside temperature. Instead, a plurality of reference values for the housing inside temperature may be set up. For example, a first reference value used for determining whether or not the cooling fan 65 is to be turned ON and a second reference value used for determining whether or not the cooling fan 65 is to be turned OFF may be set up. The first reference value used for determining whether or not the cooling fan 65 is to be turned ON is set to be a temperature value higher than the second reference value used for determining whether or not the cooling fan 65 is to be turned OFF. For example, the first reference value may be set to be 40° C. and the second reference value may be set to be 30° C. Preferably, a configuration is employed that a difference of suitable amount is set up between the first reference value and the second reference value so that ON/OFF of the cooling fan 65 is not frequently repeated. This configuration avoids service life shortening and breakage in the switching means (not illustrated) (e.g., a relay or a semiconductor relay) of the fan drive circuit 83 performing the electric current supply to the cooling fan 65.

At step S6, on the basis of the detection result of the temperature sensor 62a, the system control part 71 determines whether or not the temperature of the MH tank 62 is at or below 15° C. This is because when the hydrogen absorbing alloy contained in the MH tank 62 goes excessively low, a sufficient rate of hydrogen is not released.

At step S6, if it is determined that the temperature of the MH tank 62 is at or below 15° C. (YES), the system control part 71 proceeds the control processing to step S7. At step S7, the system control part 71 transmits an instruction (e.g., a signal) of turning ON the MH heater 62b to the heater drive circuit 84. On the basis of the instruction of the system control part 71, the heater drive circuit 84 starts electric current supply to the MH heater 62b. By virtue of this, the MH heater 62b goes ON and hence the MH heater 62b generates heat. After that, the system control part 71 proceeds the control processing to step S9.

On the other hand, at step S6, if it is determined that the temperature of the MH tank 62 is not at or below 15° C. (NO), the system control part 71 proceeds the control processing to step S8. At step S8, the system control part 71 transmits an instruction (e.g., a signal) of turning OFF the MH heater 62b to the heater drive circuit 84. As described above, the control processing of steps S2 to S11 is repeated and hence, in some cases, the MH heater 62b is being ON as a result of the previous control at step S7. In this case, on the basis of the instruction of the system control part 71 at step S8 of this time, the heater drive circuit 84 stops the electric current supply to the MH heater 62b. By virtue of this, the MH heater 62b goes OFF and hence the MH heater 62b stops the heat generation. After that, the system control part 71 proceeds the control processing to step S9.

Here, at step S6 of the present embodiment, the ON/OFF operation of the MH heater 62b is determined on the basis of the single reference value (15° C.) for the temperature of the MH tank 62. Then, a plurality of reference values may be set up for the temperature of the MH tank 62. For example, a first reference value used for determining whether or not the MH heater 62b is to be turned ON and a second reference value used for determining whether or not the MH heater 62b is to be turned OFF may be set up. The first reference value used for determining whether or not the MH heater 62b is to be turned ON is set to be a temperature value lower than the second reference value used for determining whether or not the MH heater 62b is to be turned OFF. Preferably, a configuration is employed that a difference of suitable amount is set up between the first reference value and the second reference value so that ON/OFF of the MH heater 62b is not frequently repeated. This configuration avoids service life shortening and breakage in the switching means (not illustrated) (e.g., a relay or a semiconductor relay) of the heater drive circuit 84 performing the electric current supply to the MH heater 62b.

At step S9, on the basis of the detection result of the temperature sensor 63a, the system control part 71 determines whether or not the temperature of the control valve 63 is at or below 5° C. When the waterdrops collected in the control valve 63 freeze, a possibility arises that the control valve 63 does not become open at the next time of starting the fuel cell 6.

At step S9, if it is determined that the temperature of the control valve 63 is at or below 5° C. (YES), the system control part 71 proceeds the control processing to step S10. At step S10, the system control part 71 transmits an instruction (e.g., a signal) of turning ON the control valve heater 63b to the heater drive circuit 84. On the basis of the instruction of the system control part 71, the heater drive circuit 84 starts electric current supply to the control valve heater 63b. By virtue of this, the control valve heater 63b goes ON and hence the control valve heater 63b generates heat. After that, the system control part 71 proceeds the control processing to step S1.

On the other hand, at step S9, if it is determined that the temperature of the control valve 63 is not at or below 5° C. (NO), the system control part 71 proceeds the control processing to step S11. At step S11, the system control part 71 transmits an instruction (e.g., a signal) of turning OFF the control valve heater 63b to the heater drive circuit 84. As described above, the control processing of steps S2 to S11 is repeated and hence, in some cases, the control valve heater 63b is being ON as a result of the previous control at step S10. In this case, on the basis of the instruction of the system control part 71 at step S11 of this time, the heater drive circuit 84 stops the electric current supply to the control valve heater 63b. By virtue of this, the control valve heater 63b goes OFF and hence the control valve heater 63b stops the heat generation. After that, the system control part 71 proceeds the control processing to step S1.

Here, at step S9 of the present embodiment, the ON/OFF operation of the control valve heater 63b is determined on the basis of the single reference value (5° C.) for the temperature of the control valve 63. Then, a plurality of reference values may be set up for the temperature of the control valve 63. For example, a first reference value used for determining whether or not the control valve heater 63b is to be turned ON and a second reference value used for determining whether or not the control valve heater 63b is to be turned OFF may be set up. The first reference value used for determining whether or not the control valve heater 63b is to be turned ON is set to be a temperature value lower than the second reference value used for determining whether or not the control valve heater 63b is to be turned OFF. Preferably, a configuration is employed that a difference of suitable amount is set up between the first reference value and the second reference value so that ON/OFF of the control valve heater 63b is not frequently repeated. This configuration avoids service life shortening and breakage in the switching means (not illustrated) (e.g., a relay or a semiconductor relay) of the heater drive circuit 84 performing the electric current supply to the control valve heater 63b.

At step S1, the system control part 71 determines whether or not the falling edge b has been received from the voltage detection part 71a within 0.83 ms posterior to the start of the timer. That is, the system control part 71 determines the presence or absence of "power failure occurrence" of the commercial alternating current power source 2 defined as in the present embodiment. If it is determined that the falling edge b has been received from the voltage detection part 71a within 0.83 ms posterior to the start of the timer, that is, the absence of power failure of the commercial alternating current power source 2 is concluded (NO), the system control part 71 repeats the above-described control of steps S2 to S11 for a normal situation.

<<Control in Situation of Power Failure>>

On the other hand, at step S1, if it is determined that the falling edge b has not been received within 0.83 ms posterior to the start of the timer (YES), that is, in the presence of power failure of the commercial alternating current power source 2, the system control part 71 proceeds the control processing to step S12. Here, at the time that the determination at step S1 is concluded as affirmative, the system control part 71 starts the measurement of time by using a function of time counting provided as the standard in the CPU constituting the system control part 71. The measured time is stored into a storage part such as a RAM provided in the system control part 71 and then used in the determination at step S15.

At step S12, the system control part 71 transmits an instruction (the second signal H in FIG. 8A) of switching the contact of the switchover relay 3 from the first state to the second state. On the basis of the instruction from the system control part 71, the switchover relay 3 is switched from the first state to the second state (a state that the second input part 3b and the output part 3c are connected to each other). As described above, at the time c that 0.83 ms has elapsed after the rising edge "a" of the input pulse illustrated in FIG. 8A was detected, the system control part 71 transmits the second signal H at 10 V. By virtue of this, the switching of the contact of the switchover relay 3 is completed within 10 ms posterior to the occurrence of power failure.

When the contact of the switchover relay 3 has been switched from the first state to the second state, the electric power from the battery 8 is supplied through the second power feed line L2 and the inverter 9 to the load R. Further, the electric power from the battery 8 flows through the second power feed line L2 to the control board power supply 74 and the auxiliary device power supply 75 of the system control board 7 and is then supplied to the system control board 7 and the auxiliary devices of the fuel cell 6.

Figure 8B:
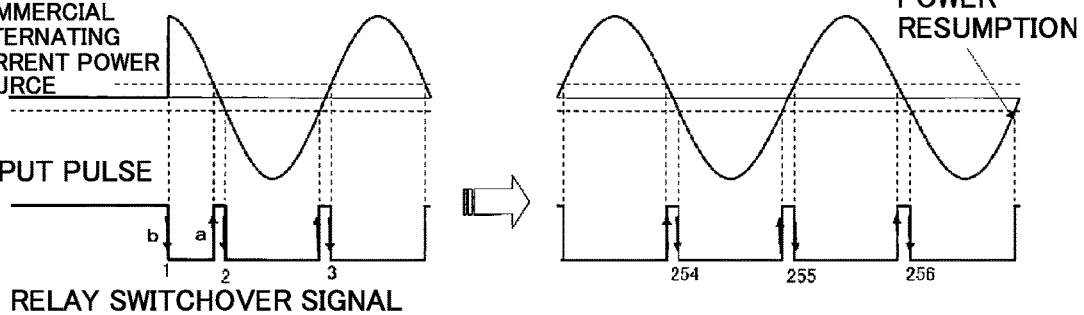
FIG. 8B is a time chart illustrating power resumption detection in an alternating current uninterruptible power supply system.

Then, the system control part 71 proceeds the control processing to step S13. At step S13, the system control part 71 determines whether or not the commercial alternating current power source 2 has resumed. The time chart of FIG. 8B illustrates a specific example of control of power resumption detection at steps S13 and S17. The "commercial alternating current power source" in FIG. 8B indicates the alternating voltage waveform of the commercial alternating current power source 2. The "input pulse" in FIG. 8B indicates the pulse signal inputted from the voltage detection part 71*a* to the system control part 71. The "relay switchover signal" in FIG. 8B indicates the first signal L and the second signal H transmitted from the system control part 71 to the switchover relay 3. As described above, in the present embodiment, the first signal L is set to be 0 V and the second signal H is set to be 10 V.

As illustrated in FIG. 8A, at the time of power failure of the commercial alternating current power source 2, the voltage of the commercial alternating current power source 2 becomes a constant of 0 V and hence a state is caused that the pulse signal inputted from the voltage detection part 71*a* to the system control part 71 remains high (see the part indicated by an arrow c in FIG. 8A). From this state, when the electric power supply of the commercial alternating current power source 2 is recovered, as illustrated in FIG. 8B, the pulse signal inputted from the voltage detection part 71*a* to the system control part 71 falls. The system control part 71 detects the falling edge b of the pulse signal inputted from the voltage detection part 71*a*. At the time that the falling edge b is detected, the system control part 71 permits interruption and sets the zero crossing count to be 1. After that, at each time that the rising edge "a" and the falling edge b are detected in the pulse signal inputted from the voltage detection part 71*a*, the system control part 71 adds 1 to the zero crossing count. The "power resumption" of the commercial alternating current power source 2 in the present embodiment is defined as a state that the zero crossing count has reached "256". The time until the zero crossing count reaches "256" is approximately 2.5 seconds.

At step S13, if it is determined that the zero crossing count has reached "256" (YES), that is, if the commercial alternating current power source 2 has resumed, the system control part 71 proceeds the control processing to step S14. At step S14, the system control part 71 transmits the first signal L at 0 V illustrated in FIG. 8B to the switchover relay 3. By virtue of this, the contact of the switchover relay 3 is changed from the second state to the first state (a state that the first input part 3*a* and the output part 3*c* are connected to each other). According to such control processing of power resumption detection, whether or not the power of the commercial alternating current power source 2 has normally resumed is allowed to be determined accurately in a time as short as approximately 2.5 seconds. The count number "256" of zero crossing described here is an example of the given duration (the time length of continuation of the electric power supply) used for determining whether or not the electric power supply from the commercial alternating current power source has resumed.

After that, the system control part 71 proceeds the control processing to step S1. At step S1, the system control part 71 determines whether or not the falling edge b has been received from the voltage detection part 71*a* within 0.83 ms posterior to the start of the timer, that is, whether or not power failure of the commercial alternating current power source 2 has occurred. If it is determined that the falling edge b has been received from the voltage detection part 71*a* within 0.83 ms posterior to the start of the timer (NO), that is, in the absence of power failure of the commercial alternating current power source 2, the system control part 71 repeats the above-described control of steps S2 to S11 for a normal situation.

On the other hand, at step S13, if it is determined that the zero crossing count has not reached "256" (NO), that is, if the commercial alternating current power source 2 has not resumed, the system control part 71 proceeds the control processing to step S15. At step S15, the system control part 71 determines whether or not 10 seconds has elapsed after the occurrence of power failure of the commercial alternating current power source 2. This determination at step S15 is started at the time that determination at step S1 is concluded as affirmative. Then, the determination is performed with reference to the measuring time stored in the storage part such as a RAM.

At step S15, if it is determined that 10 seconds has not elapsed after the occurrence of power failure of the commercial alternating current power source 2 (NO), the system control part 71 repeats the determination at steps S13 and S15. If it is determined that before 10 seconds has elapsed after the occurrence of power failure (NO at step S15), the zero crossing count has reached "256" (YES at step S13), that is, the commercial alternating current power source 2 has resumed, the system control part 71 proceeds the control processing to step S14. At step S14, the system control part 71 transmits the first signal L at 0 V illustrated in FIG. 8B to the switchover relay 3. By virtue of this, the contact of the switchover relay 3 is changed from the second state to the first state (a state that the first input part 3*a* and the output part 3*c* are connected to each other). That is, the supply source of electric power is switched from the battery 8 to the commercial alternating current power source 2. After that, the control processing of the alternating current uninterruptible power supply system 1 is returned to step S1.

On the other hand, at step S15, if it is determined that 10 seconds has elapsed after the occurrence of power failure of the commercial alternating current power source 2 (YES), the system control part 71 proceeds the control processing to step S16. At step S16, the system control part 71 performs the control processing of starting the fuel cell 6.

Here, outlines of the control processing of starting the fuel cell 6 are described below with reference to FIGS. 1 and 2. As illustrated in FIG. 2, the first control valve 63A and the second control valve 63B described above are arranged in the hydrogen passage member 10 connected to the anode-side inlet of the stack 100. The third control valve 63C is arranged in the hydrogen passage member 10 connected to the anode-side outlet of the stack 100. The fourth control valve 63D is arranged in the air passage member 20 connected to the cathode-side outlet of the stack 100. The fifth control valve 63E is arranged in the middle of the substitution passage member 30. When the fuel cell 6 is being stopped, the first control valve 63A, the second control valve 63B, the third control valve 63C, the fourth control valve 63D, and the fifth control valve 63E are all being closed.

The system control part 71 transmits instructions (e.g., control signals generated by ON/OFF operation of transistors) of individually performing opening operation of the first control valve 63A, the second control valve 63B, and the third control valve 63C, to the control valve drive circuit 82. On the basis of the instructions from the system control part 71, the control valve drive circuit 82 starts electric current supply to the first control valve 63A, the second control valve 63B, and the third control valve 63C. The first control valve 63A, the second control valve 63B, and the third control valve 63C receiving the electric current supply from the control valve drive circuit 82 go into an opened state individually. By virtue of this, the hydrogen released from the hydrogen absorbing alloy contained in the MH tank 62 is supplied through the hydrogen passage member 10 connected to the anode-side inlet into the anode side of the stack 100. As time progresses, the second passages 117*a* (see FIG. 5B) on the anode side of each separator 110 constituting the stack 100 are filled with the hydrogen.

The system control part 71 transmits an instruction (e.g., a control signal generated by ON/OFF operation of a transistor) of performing opening operation of the fourth control valve 63D to the control valve drive circuit 82. On the basis of the instruction from the system control part 71, the control valve drive circuit 82 starts electric current supply to the fourth control valve 63D. The fourth control valve 63D receiving the electric current supply from the control valve drive circuit 82 goes into an opened state. By virtue of this, the air passage member 20 connected to the cathode-side outlet of the stack 100 is opened.

After a given time has elapsed, that is, after the second passages 117a on the anode side of each separator 110 constituting the stack 100 has been filled with the hydrogen, the system control part 71 transmits an instruction (e.g., a control signal generated by ON/OFF operation of a transistor) of performing closing operation of the third control valve 63C to the control valve drive circuit 82. On the basis of the instruction from the system control part 71, the control valve drive circuit 82 stops the electric current supply to the third control valve 63C. The third control valve 63C no longer receiving the electric current supply from the control valve drive circuit 82 goes into a closed state. By virtue of this, the hydrogen passage member 10 connected to the anode-side outlet of the stack 100 is closed.

The system control part 71 transmits an instruction (e.g., a control signal generated by ON/OFF operation of a transistor) of turning ON the air pump 61 to the pump drive circuit 81. On the basis of the instruction from the system control part 71, the pump drive circuit 81 starts electric current supply to the air pump 61. The air pump 61 receiving the electric current supply from the pump drive circuit 81 goes ON. The air pump 61 starts air supply to the air passage member 20 connected to the cathode-side inlet of the stack 100. By virtue of this, air is supplied to the first passages 111a (see FIG. 5A) on the cathode side of each separator 110 constituting the stack 100 so that power generation by the stack 100 is started.

As described above, in the alternating current uninterruptible power supply system 1 of the present embodiment, if the commercial alternating current power source 2 has not resumed (NO at step S13) and 10 seconds has elapsed after the occurrence of power failure (YES at step S15), the fuel cell 6 is started (step S16). That is, the fuel cell 6 is started depending on the duration time of power failure. The fuel cell 6 is not started at the time of momentary power failure of 10 seconds or shorter.

Then, the system control part 71 proceeds the control processing to step S17. At step S17, similarly to step S13, the system control part 71 determines whether or not the zero crossing count has reached "256". If it is determined that the zero crossing count has not reached "256" (NO), that is, if the commercial alternating current power source 2 has not resumed, the system control part 71 repeats the determination at step S17.

During the time that the determination at step S17 is repeated successively, the fuel cell 6 having been started by the control at step S16 continues operating. The electric power from the fuel cell 6 is supplied to the system control board 7. The electric power supplied to the system control board 7 flows through the electric current/voltage detection part 76, the cutoff circuit 77, the power circuit 78, and the electric current/voltage detection part 79 to the second power feed line L2. The electric power flowing through the second power feed line L2 is supplied through the inverter 9 to the load R. During the time that the fuel cell 6 continues operating, the battery 8 is charged with the electric power flowing through the second power feed line L2.

On the other hand, at step S17, if it is determined that the zero crossing count has reached "256" (YES), that is, if the commercial alternating current power source 2 has resumed, the system control part 71 proceeds the control processing to step S18. At step S18, the system control part 71 transmits the first signal L at 0 V illustrated in FIG. 8B to the switchover relay 3. By virtue of this, the contact of the switchover relay 3 is changed from the second state to the first state (a state that the first input part 3a and the output part 3c are connected to each other).

Then, the system control part 71 proceeds the control processing to step S19. At step S19, the system control part 71 performs the control processing of stopping the fuel cell 6.

Here, outlines of the control processing of stopping the fuel cell 6 are described below with reference to FIGS. 1 and 2. When the fuel cell 6 is operating, the first control valve 63A, the second control valve 63B, and the fourth control valve 63D are in an opened state. The third control valve 63C and the fifth control valve 63E are in a closed state.

The system control part 71 transmits instructions (e.g., control signals generated by ON/OFF operation of transistors) of performing closing operation of the first control valve 63A and the fourth control valve 63D, to the control valve drive circuit 82. On the basis of the instructions from the system control part 71, the control valve drive circuit 82 stops the electric current supply to the first control valve 63A and the fourth control valve 63D. The first control valve 63A and the fourth control valve 63D no longer receiving the electric current supply from the control valve drive circuit 82 go into a closed state. By virtue of this, the hydrogen supply from the MH tank 62 to the anode side of the stack 100 is stopped Further, the air passage member 20 connected to the cathode-side outlet of the stack 100 is closed.

The system control part 71 transmits instructions (e.g., control signals generated by ON/OFF operation of transistors) of performing opening operation of the third control valve 63C and the fifth control valve 63E, to the control valve drive circuit 82. On the basis of the instructions from the system control part 71, the control valve drive circuit 82 starts electric current supply to the third control valve 63C and the fifth control valve 63E. The third control valve 63C and the fifth control valve 63E receiving the electric current supply from the control valve drive circuit 82 go into an opened state. Since the fifth control valve 63E goes into an opened state, the hydrogen passage member 10 and the air passage member 20 go into fluid communication with each other via the substitution passage member 30. By virtue of this, the air supplied from air pump 21 flows through the air passage member 20, the substitution passage member 30, and the hydrogen passage member 10 into the anode side of the stack 100. As a result, the hydrogen remaining in the second passages 117a (see FIG. 5B) of each separator 110 constituting the stack 100 is discharged to the outside from the hydrogen passage member 10 connected to the outlet on the anode side of the stack 100.

The system control part 71 transmits an instruction (e.g., a control signal generated by ON/OFF operation of a transistor) of turning OFF the air pump 61 to the pump drive circuit 81. On the basis of the instruction from the system control part 71, the pump drive circuit 81 stops the electric current supply to the air pump 61. The air pump 61 no longer receiving the electric current supply from the pump drive circuit 81 goes OFF. The air pump 61 stops the air supply to the air passage member 20 connected to the cathode-side inlet of the stack 100.

The system control part 71 transmits instructions (e.g., control signals generated by ON/OFF operation of transistors) of performing closing operation of the second control valve 63B, the third control valve 63C, and the fifth control valve 63E, to the control valve drive circuit 82. On the basis of the instructions from the system control part 71, the control valve drive circuit 82 stops the electric current supply to the second control valve 63B, the third control valve 63C, and the fifth control valve 63E. The second control valve 63B, the third control valve 63C, and the fifth control valve 63E no longer receiving the electric current supply from the control valve drive circuit 82 go into a closed state. By virtue of this, all of the first control valve 63A, the second control valve 63B, the third control valve 63C, the fourth control valve 63D, and the fifth control valve 63E go into a closed state so that the control of stopping the fuel cell 6 is completed.

After that, the system control part 71 proceeds the control processing to step S1. At step S1, the system control part 71 determines whether or not the falling edge b has been received from the voltage detection part 71*a* within 0.83 ms posterior to the start of the timer, that is, whether or not power failure of the commercial alternating current power source 2 has occurred. If it is determined that the falling edge b has been received from the voltage detection part 71*a* within 0.83 ms posterior to the start of the timer (NO), that is, in the absence of power failure of the commercial alternating current power source 2, the system control part 71 repeats the above-described control of steps S2 to S11 for a normal situation.

<Operation Effect>

The alternating current uninterruptible power supply system 1 of the present embodiment starts the fuel cell 6 depending on the duration time of power failure. Further, the alternating current uninterruptible power supply system 1 of the present embodiment stops the fuel cell 6 depending on the duration time of power resumption. By virtue of this configuration, in the alternating current uninterruptible power supply system 1 of the present embodiment, a situation is avoided that unstable operation is caused in the fuel cell 6 by momentary power failure and power resumption which may frequently occur. That is, in the alternating current uninterruptible power supply system 1 of the present embodiment, both start control and stop control of the fuel cell 6 for emergency are allowed to be stably performed.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

What is claimed is:

1. An alternating current uninterruptible power supply system supplying electric power from a fuel cell at the time of power failure of a commercial alternating current power source, comprising:
   a switch provided with a first input part, a second input part, and an output part and allowed to perform, in response to an inputted instruction, switching to a first state that the first input part and the output part are connected to each other or to a second state that the second input part and the output part are connected to each other;
   a first power feed line electrically connected to the first input part of the switch and transmitting electric power from the commercial alternating current power source;
   a second power feed line electrically connected to the second input part of the switch and transmitting electric power from the fuel cell;
   the fuel cell electrically connected to the second power feed line and provided with a stack constructed from a plurality of unit battery cells generating electric power by means of a reaction between fuel gas and oxidation gas and with a plurality of control valves allowed to adjust supply of the fuel gas and the oxidation gas to the stack in response to an inputted instruction;
   a battery allowed to be charged and connected to the second power feed line in parallel to the stack;
   a converter connected between the first power feed line and the second power feed line;
   an inverter connected to the second power feed line between the battery and the second input part;
   an electric power detection part outputting a result corresponding to a state of the electric power from the commercial alternating current power source flowing through the first power feed line; and
   a control part, wherein
   the control part performs at least the following controls a) to d):
   a) a control of, on the basis of the result outputted from the electric power detection part, determining whether or not the electric power supply from the commercial alternating current power source has stopped for a first time or longer;
   b) a control of b consisting of the following controls b1) to b3),
      b1) if it is determined that the electric power supply from the commercial alternating current power source has stopped for the first time or longer, transmitting an instruction of switching a contact from the first state to the second state to the switch;
      b2) a control of determining whether or not the commercial alternating current power source has resumed; and
      b3) a control of, transmitting an instruction of switching a contact from the second state to the first state to the switch if it is determined that the commercial alternating current power source has resumed, or proceeding the control processing to the control of c),
   c) a control of, if it is determined that the commercial alternating current power source has not resumed, on the basis of the result outputted from the electric power detection part, determining whether or not the stopping of the electric power supply from the commercial alternating current power source has continued for a second time or longer which is longer than the first time; and
   d) a control of, if it is determined that the stopping of the electric power supply from the commercial alternating current power source has continued for the second time or longer, transmitting an instruction of starting power generation of the fuel cell to the fuel cell.

2. The alternating current uninterruptible power supply system according to claim 1, wherein
   the control part performs the following controls e) to g):

e) a control of, after the control d) described above, on the basis of the result outputted from the electric power detection part, determining whether or not the electric power supply from the commercial alternating current power source has continued for a given duration;

f) a control of, if it is determined that the electric power supply from the commercial alternating current power source has continued for the given duration, transmitting an instruction of switching the contact from the second state to the first state to the switch; and g) a control of, if it is determined that the electric power supply from the commercial alternating current power source has continued for the given duration, transmitting an instruction of stopping the power generation of the fuel cell to the fuel cell.

3. The alternating current uninterruptible power supply system according to claim 1, wherein the fuel cell includes:
a cooling fan supplying wind to the stack; and
a first temperature detection part outputting a result corresponding to a temperature of the inside of a housing containing the fuel cell to the control part, and wherein the control part performs at least the following controls h) to j):

h) a control of, in the control a) described above, if it is determined that the electric power supply from the commercial alternating current power source has not stopped for the first time or longer, on the basis of the result from the first temperature detection part, determining whether or not the temperature of the inside of the housing is at or above a threshold;

i) a control of, if it is determined that the temperature of the inside of the housing is at or above the threshold, transmitting an instruction of operating the cooling fan to the cooling fan; and j) a control of, after the control i) described above, if it is determined that the temperature of the inside of the housing is not at or above the threshold, transmitting an instruction of stopping the cooling fan to the cooling fan.

4. The alternating current uninterruptible power supply system according to claim 1 wherein the fuel cell includes:
a first heater receiving electric power through the first power feed line so as to warm a supply source of the fuel gas of the fuel cell; and
a second temperature detection part outputting a result corresponding to a temperature of the supply source of the fuel gas to the control part, and wherein
the control part performs at least the following controls k) to m):

k) a control of, in the control a) described above, if it is determined that the electric power supply from the commercial alternating current power source has not stopped for the first time or longer, on the basis of the result from the second temperature detection part, determining whether or not the temperature of the supply source of the fuel gas of the fuel cell is at or below a threshold;

l) a control of, if it is determined that the temperature of the supply source of the fuel gas is at or below the threshold, transmitting an instruction of turning ON the first heater to the first heater; and m) a control of, after the control l) described above, if it is determined that the temperature of the supply source of the fuel gas is not at or below the threshold, transmitting an instruction of turning OFF the first heater to the first heater.

5. The alternating current uninterruptible power supply system according to claim 1, wherein the fuel cell includes:
a third temperature detection part outputting a result corresponding to a temperatures of the control valve to the control part, and
a second heater electrically connected to the first power feed line so as to warm the control valve, and wherein the control part performs the following controls n) to p):

n) a control of, in the control a) described above, if it is determined that the electric power supply from the commercial alternating current power source has not stopped for the first time or longer, on the basis of the result from the third temperature detection part, determining whether or not a temperature of the control valve of the fuel cell is at or below a threshold;

o) a control of, if it is determined that the temperature of the control valve is at or below the threshold, transmitting an instruction of turning ON the second heater to the second heater; and p) a control of, after the control o) described above, if it is determined that the temperature of the control valve is not at or below the threshold, transmitting an instruction of turning OFF the second heater to the second heater.

6. The alternating current uninterruptible power supply system according to claim 1, wherein in the control b) described above, if a width of a pulse signal corresponding to zero crossing of the commercial alternating current power source is greater than or equal to the first time, the control part transmits an instruction of switching the contact from the first state to the second state to the switch.

7. The alternating current uninterruptible power supply system according to claim 2, wherein in the control b) described above, if a width of a pulse signal corresponding to zero crossing of the commercial alternating current power source is greater than or equal to the first time, the control part transmits an instruction of switching the contact from the first state to the second state to the switch.

8. The alternating current uninterruptible power supply system according to claim 3, wherein in the control b) described above, if a width of a pulse signal corresponding to zero crossing of the commercial alternating current power source is greater than or equal to the first time, the control part transmits an instruction of switching the contact from the first state to the second state to the switch.

9. The alternating current uninterruptible power supply system according to claim 4, wherein in the control b) described above, if a width of a pulse signal corresponding to zero crossing of the commercial alternating current power source is greater than or equal to the first time, the control part transmits an instruction of switching the contact from the first state to the second state to the switch.

10. The alternating current uninterruptible power supply system according to claim 5, wherein in the control b) described above, if a width of a pulse signal corresponding to zero crossing of the commercial alternating current power source is greater than or equal to the first time, the control part transmits an instruction of switching the contact from the first state to the second state to the switch.

11. The alternating current uninterruptible power supply system according to claim 6, wherein in the control f) described above, if the number of pulse signals corresponding to zero crossing of the commercial alternating current power source is greater than or equal to a given value, the control part transmits an instruction of switching the contact from the second state to the first state to the switch.

12. The alternating current uninterruptible power supply system according to claim 7, wherein in the control f) described above, if the number of pulse signals corresponding to zero crossing of the commercial alternating current power source is greater than or equal to a given value, the control part transmits an instruction of switching the contact from the second state to the first state to the switch.

13. The alternating current uninterruptible power supply system according to claim 8, wherein in the control f) described above, if the number of pulse signals corresponding to zero crossing of the commercial alternating current power source is greater than or equal to a given value, the control part transmits an instruction of switching the contact from the second state to the first state to the switch.

14. The alternating current uninterruptible power supply system according to claim 9, wherein in the control f) described above, if the number of pulse signals corresponding to zero crossing of the commercial alternating current power source is greater than or equal to a given value, the control part transmits an instruction of switching the contact from the second state to the first state to the switch.

15. The alternating current uninterruptible power supply system according to claim 10, wherein in the control f) described above, if the number of pulse signals corresponding to zero crossing of the commercial alternating current power source is greater than or equal to a given value, the control part transmits an instruction of switching the contact from the second state to the first state to the switch.

16. An alternating current uninterruptible power supply system supplying electric power from a fuel cell at the time of power failure of a commercial alternating current power source, comprising:
  a switch provided with a first input part, a second input part, and an output part and allowed to perform, in response to an inputted instruction, switching to a first state that the first input part and the output part are connected to each other or to a second state that the second input part and the output part are connected to each other;
  a first power feed line electrically connected to the first input part of the switch and transmitting electric power from the commercial alternating current power source;
  a second power feed line electrically connected to the second input part of the switch and transmitting electric power from the fuel cell;
  the fuel cell electrically connected to the second power feed line and provided with a stack constructed from a plurality of unit battery cells generating electric power by means of a reaction between fuel gas and oxidation gas and with a plurality of control valves allowed to adjust supply of the fuel gas and the oxidation gas to the stack in response to an inputted instruction;
  a battery allowed to be charged and connected to the second power feed line in parallel to the stack;
  a converter connected between the first power feed line and the second power feed line;
  an inverter connected to the second power feed line between the battery and the second input part;
  an electric power detection part outputting a result corresponding to a state of the electric power from the commercial alternating current power source flowing through the first power feed line;
  a control part;
  a cooling fan supplying wind to the stack; and
  a first temperature detection part outputting a result corresponding to a temperature of the inside of a housing containing the fuel cell to the control part, and wherein the control part performs at least the following controls a) to d) and h) to j):
  a) a control of, on the basis of the result outputted from the electric power detection part, determining whether or not the electric power supply from the commercial alternating current power source has stopped for a first time or longer;
  b) a control of, if it is determined that the electric power supply from the commercial alternating current power source has stopped for the first time or longer, transmitting an instruction of switching a contact from the first state to the second state to the switch;
  c) a control of, after the control b) described above, on the basis of the result outputted from the electric power detection part, determining whether or not the stopping of the electric power supply from the commercial alternating current power source has continued for a second time or longer which is longer than the first time; and
  d) a control of, if it is determined that the stopping of the electric power supply from the commercial alternating current power source has continued for the second time or longer, transmitting an instruction of starting power generation of the fuel cell to the fuel cell;
  h) a control of, in the control a) described above, if it is determined that the electric power supply from the commercial alternating current power source has not stopped for the first time or longer, on the basis of the result from the first temperature detection part, determining whether or not the temperature of the inside of the housing is at or above a threshold;
  i) a control of, if it is determined that the temperature of the inside of the housing is at or above the threshold, transmitting an instruction of operating the cooling fan to the cooling fan; and
  j) a control of, after the control i) described above, if it is determined that the temperature of the inside of the housing is not at or above the threshold, transmitting an instruction of stopping the cooling fan to the cooling fan.

17. An alternating current uninterruptible power supply system supplying electric power from a fuel cell at the time of power failure of a commercial alternating current power source, comprising:
  a switch provided with a first input part, a second input part, and an output part and allowed to perform, in response to an inputted instruction, switching to a first state that the first input part and the output part are connected to each other or to a second state that the second input part and the output part are connected to each other;
  a first power feed line electrically connected to the first input part of the switch and transmitting electric power from the commercial alternating current power source;
  a second power feed line electrically connected to the second input part of the switch and transmitting electric power from the fuel cell;
  the fuel cell electrically connected to the second power feed line and provided with a stack constructed from a plurality of unit battery cells generating electric power by means of a reaction between fuel gas and oxidation gas and with a plurality of control valves allowed to adjust supply of the fuel gas and the oxidation gas to the stack in response to an inputted instruction;
  a battery allowed to be charged and connected to the second power feed line in parallel to the stack;

a converter connected between the first power feed line and the second power feed line;

an inverter connected to the second power feed line between the battery and the second input part;

an electric power detection part outputting a result corresponding to a state of the electric power from the commercial alternating current power source flowing through the first power feed line;

a control part;

a first heater receiving electric power through the first power feed line so as to warm a supply source of the fuel gas of the fuel cell; and a second temperature detection part outputting a result corresponding to a temperature of the supply source of the fuel gas to the control part, and wherein the control part performs at least the following controls a) to d) and k) to m):

a) a control of, on the basis of the result outputted from the electric power detection part, determining whether or not the electric power supply from the commercial alternating current power source has stopped for a first time or longer;

b) a control of, if it is determined that the electric power supply from the commercial alternating current power source has stopped for the first time or longer, transmitting an instruction of switching a contact from the first state to the second state to the switch;

c) a control of, after the control b) described above, on the basis of the result outputted from the electric power detection part, determining whether or not the stopping of the electric power supply from the commercial alternating current power source has continued for a second time or longer which is longer than the first time; and d) a control of, if it is determined that the stopping of the electric power supply from the commercial alternating current power source has continued for the second time or longer, transmitting an instruction of starting power generation of the fuel cell to the fuel cell;

k) a control of, in the control a) described above, if it is determined that the electric power supply from the commercial alternating current power source has not stopped for the first time or longer, on the basis of the result from the second temperature detection part, determining whether or not the temperature of the supply source of the fuel gas of the fuel cell is at or below a threshold;

l) a control of, if it is determined that the temperature of the supply source of the fuel gas is at or below the threshold, transmitting an instruction of turning ON the first heater to the first heater; and m) a control of, after the control l) described above, if it is determined that the temperature of the supply source of the fuel gas is not at or below the threshold, transmitting an instruction of turning OFF the first heater to the first heater.

* * * * *